(12) United States Patent
Canel-Katz et al.

(10) Patent No.: US 7,974,438 B2
(45) Date of Patent: Jul. 5, 2011

(54) SPATIAL DATA ENCODING AND DECODING

(75) Inventors: Lilly Canel-Katz, Clayton, MO (US); James G. Withers, Chesterfield, MO (US); Jonathan I. Katz, Clayton, MO (US); David Imler, Saint Louis, MO (US)

(73) Assignee: Koplar Interactive Systems International, LLC, St. Louis, MO (US)

(*) Notice: Subject to any disclaimer, the term of this patent is extended or adjusted under 35 U.S.C. 154(b) by 799 days.

(21) Appl. No.: 12/001,545

(22) Filed: Dec. 11, 2007

(65) Prior Publication Data
US 2008/0193023 A1 Aug. 14, 2008

Related U.S. Application Data

(60) Provisional application No. 60/874,373, filed on Dec. 11, 2006, provisional application No. 60/883,619, filed on Jan. 5, 2007, provisional application No. 60/909,671, filed on Apr. 2, 2007.

(51) Int. Cl.
*G06K 9/00* (2006.01)

(52) U.S. Cl. ........ 382/100; 382/232; 382/233; 382/236; 382/250; 382/251; 713/176

(58) Field of Classification Search .................. 382/100, 382/232, 233, 162, 240, 250, 251, 236; 713/176; 380/210, 252, 287; 348/461, 463
See application file for complete search history.

(56) References Cited

U.S. PATENT DOCUMENTS

| | | |
|---|---|---|
| 4,807,031 A | 2/1989 | Broughton et al. |
| 5,305,104 A | 4/1994 | Jensen et al. |
| 5,521,984 A | 5/1996 | Denenberg et al. |
| 5,594,493 A | 1/1997 | Nemirofsky |
| 5,644,363 A | 7/1997 | Mead |
| 5,767,896 A | 6/1998 | Namirofsky |
| 5,880,769 A | 3/1999 | Nemirofsky et al. |

(Continued)

FOREIGN PATENT DOCUMENTS

EP 0957448 11/1999

(Continued)

OTHER PUBLICATIONS

"U.S. Appl. No. 10/817,109 Preliminary Amendment", 8 pgs.

(Continued)

*Primary Examiner* — Samir Ahmed
*Assistant Examiner* — Ali Bayat
(74) *Attorney, Agent, or Firm* — Clise, Billion & Cyr, P.A.; Tim Clise

(57) ABSTRACT

Methods and systems for spatial data encoding and decoding are described. A tile may be designated within a source frame. The tile may be divided into at least one bit area. A particular message bit value of a message may be accessed. A statistical property calculation may be performed on a pixel variable value of available pixels within the tile. A pixel variable value of pixels in the particular bit area of a target frame may be shifted to encode a particular message bit. A particular pixel variable value of a particular pixel of the plurality of pixels may be shifted by a shift value. The shift value may be in accordance with the statistical property calculation, the particular message bit value, and a particular modulation pattern value of the plurality of modulation pattern values for the particular pixel within the particular bit area.

21 Claims, 17 Drawing Sheets

U.S. PATENT DOCUMENTS

| | | | |
|---|---|---|---|
| 5,907,350 | A | 5/1999 | Nemirofsky |
| 5,953,047 | A | 9/1999 | Nemirofsky |
| 6,094,228 | A | 7/2000 | Ciardullo et al. |
| 6,215,526 | B1 | 4/2001 | Barton et al. |
| 6,229,572 | B1 | 5/2001 | Ciardullo et al. |
| 6,285,774 | B1 | 9/2001 | Schumann et al. |
| 6,370,275 | B1 | 4/2002 | Benoit et al. |
| 6,404,440 | B1 | 6/2002 | Doyen et al. |
| 6,449,379 | B1 | 9/2002 | Rhoads |
| 6,473,804 | B1 | 10/2002 | Kaiser et al. |
| 6,604,682 | B2 | 8/2003 | Wakamiya et al. |
| 6,661,905 | B1 | 12/2003 | Chupp et al. |
| 6,766,956 | B1 | 7/2004 | Boylan |
| 7,025,272 | B2 | 4/2006 | Yavid et al. |
| 7,156,311 | B2 | 1/2007 | Attia et al. |
| 7,159,117 | B2 * | 1/2007 | Tanaka .......................... 713/176 |
| 7,167,209 | B2 | 1/2007 | Cookson et al. |
| 7,168,621 | B2 | 1/2007 | Ghai et al. |
| 7,242,816 | B2 | 7/2007 | Attia et al. |
| 7,245,780 | B2 | 7/2007 | Attia et al. |
| 7,287,696 | B2 | 10/2007 | Attia et al. |
| 7,296,747 | B2 | 11/2007 | Rohs |
| 7,309,015 | B2 | 12/2007 | Frantz et al. |
| 7,502,759 | B2 | 3/2009 | Hannigan et al. |
| 7,567,671 | B2 | 7/2009 | Gupte |
| 7,570,781 | B2 | 8/2009 | Rhoads et al. |
| 7,646,881 | B2 * | 1/2010 | Zarrabizadeh ................ 382/100 |
| 7,646,882 | B2 * | 1/2010 | Muratani ...................... 382/100 |
| 7,738,673 | B2 * | 6/2010 | Reed .............................. 382/100 |
| 7,738,711 | B2 * | 6/2010 | Kondo et al. ................. 382/232 |
| 7,808,554 | B2 | 10/2010 | Soneira |
| 2001/0009867 | A1 | 7/2001 | Sakaguchi et al. |
| 2001/0017932 | A1 | 8/2001 | Chang |
| 2002/0016750 | A1 | 2/2002 | Attia |
| 2002/0080271 | A1 | 6/2002 | Eveleens et al. |
| 2002/0112250 | A1 | 8/2002 | Koplar et al. |
| 2002/0183102 | A1 | 12/2002 | Withers et al. |
| 2003/0189731 | A1 | 10/2003 | Chang |
| 2003/0229900 | A1 | 12/2003 | Reisman |
| 2004/0130552 | A1 | 7/2004 | Duluk, Jr. et al. |
| 2004/0262395 | A1 | 12/2004 | Longacre, Jr. |
| 2004/0262399 | A1 | 12/2004 | Longacre, Jr. |
| 2005/0004844 | A1 | 1/2005 | Attia |
| 2005/0011957 | A1 | 1/2005 | Attia et al. |
| 2005/0015310 | A1 | 1/2005 | Frantz et al. |
| 2005/0015311 | A1 | 1/2005 | Frantz et al. |
| 2005/0029354 | A1 | 2/2005 | Frantz et al. |
| 2005/0029356 | A1 | 2/2005 | Frantz et al. |
| 2005/0033599 | A1 | 2/2005 | Frantz et al. |
| 2005/0035206 | A1 | 2/2005 | Attia et al. |
| 2005/0082370 | A1 | 4/2005 | Frantz et al. |
| 2005/0094031 | A1 | 5/2005 | Tecot |
| 2005/0121521 | A1 | 6/2005 | Ghai et al. |
| 2005/0125301 | A1 | 6/2005 | Muni |
| 2005/0246196 | A1 | 11/2005 | Frantz et al. |
| 2005/0264694 | A1 | 12/2005 | Ilan et al. |
| 2006/0011728 | A1 | 1/2006 | Frantz et al. |
| 2006/0023963 | A1 | 2/2006 | Boliek et al. |
| 2006/0080556 | A1 | 4/2006 | Rhoads |
| 2006/0175413 | A1 | 8/2006 | Longacre, Jr. |
| 2006/0188128 | A1 | 8/2006 | Rhoads |
| 2006/0193530 | A1 | 8/2006 | Attia et al. |
| 2006/0200260 | A1 | 9/2006 | Hoffberg |
| 2006/0236266 | A1 | 10/2006 | Majava |
| 2006/0282855 | A1 | 12/2006 | Margulis |
| 2006/0287105 | A1 | 12/2006 | Willis |
| 2007/0022437 | A1 | 1/2007 | Gerken |
| 2007/0063050 | A1 | 3/2007 | Attia et al. |
| 2007/0071322 | A1 | 3/2007 | Maltagliati et al. |
| 2007/0230921 | A1 | 10/2007 | Barton et al. |
| 2008/0030614 | A1 | 2/2008 | Schwab et al. |

FOREIGN PATENT DOCUMENTS

| | | |
|---|---|---|
| WO | WO-9964980 | 12/1999 |

OTHER PUBLICATIONS

"U.S. Appl. No. 10/817,109 Response to Non-Final Office Action filed Nov. 30, 2007", 11 pgs.

"U.S. Appl. No. 10/817,109 Restriction Requirement mailed Sep. 24, 2007", RERR,5 pgs.

"U.S. Appl. No. 10/817,109, Non-Final Office Action mailed Nov. 8, 2007", OARN,12 pgs.

"U.S. Appl. No. 10/817,109, Non-Final Office Action mailed Nov. 8, 2007", 12 pgs.

"U.S. Appl. No. 10/817,109, Preliminary Amendment filed Apr. 29, 2005", 13 pgs.

"U.S. Appl. No. 10/817,109, Preliminary Amendment filed Apr. 4, 2007", 8 pgs.

Calic, "Highly Efficient Low Level feature extraction for Video representation and Retrieval", Ph. D. thesis by Janco Calic, submitted to Department of Electronic engineering, Queen Mary, university of London; 2004.

Australian Patent Application No. 2004226927, Examiner's First Report dated Feb. 13, 2009 (2 pages).

International Search Report and Written Opinion mailed Apr. 24, 2008, for PCT Application No. PCT/US2007/25400, 5pgs.

International Preliminary Report on Patentability mailed Jun. 16, 2009, for PCT Application No. PCT/US2007/25400, 5 pgs.

Application U.S. Appl. no. 10/817,109 (Atty Ref 2061-009), Final Office Action mailed Sep. 5, 2008, 14 pqs.

Application U.S. Appl. no. 10/817,109 (Atty Ref 2061-009), Response to Final Office Action filed Jul. 18, 2008, 12 pqs.

Application U.S. Appl. no. 10/817,109 (Atty Ref 2061-009), Final Office Action mailed Feb. 20, 2008, 14 pqs.

\* cited by examiner

SPATIAL DATA ENCODING AND DECODING

CROSS-REFERENCE TO RELATED APPLICATIONS

This application claims the benefit of United States Provisional patent applications entitled "Spatial Data Imprinting", Ser. No. 60/874,373, filed 11 Dec. 2006, "Spatial Data Imprinting", Ser. No. 60/883,619, filed 5 Jan. 2007, and "Spatial Data Encoding and Detection", Ser. No. 60/909,671, filed 2 Apr. 2007, the entire contents of which are herein incorporated by reference.

FIELD

This application relates to a method and system for data processing, and more specifically to methods and systems for spatial data encoding and decoding.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for spatial data encoding and decoding are described. In the following description, for purposes of explanation, numerous specific details are set forth in order to provide a thorough understanding of example embodiments. It will be evident, however, to one skilled in the art that the present invention may be practiced without these specific details.

In an example embodiment, a tile may be designated within a source frame. The tile may include a plurality of available pixels. The tile may be divided into at least one bit area. A particular bit area of the at least one bit area may be capable of being encoded with a message bit. A modulation pattern including a plurality of modulation pattern values may be accessed. A particular message bit value of a message may be accessed. A statistical property calculation may be performed on a pixel variable value of the plurality of available pixels within the tile. A pixel variable value of a plurality of pixels in the particular bit area of a target frame may be shifted to encode a particular message bit of the one or more message bits. A particular pixel variable value of a particular pixel of the plurality of pixels may be shifted by a shift value. The shift value may be in accordance with the statistical property calculation, the particular message bit value, and a particular modulation pattern value of the plurality of modulation pattern values for the particular pixel within the particular bit area.

In an example embodiment, a comparison tile may be identified within a source frame. The comparison tile may include a plurality of available pixels. At least one bit area may be identified within the comparison tile. A particular bit area of the at least one bit area may be encoded with a message bit. The message bit may be associated with a message. A statistical property calculation for a plurality of pixel variable values may be performed within the comparison tile. A modulation pattern may be applied to at least one bit area of a target frame. At least one message bit in a target frame may be identified in accordance with the performing of the statistical property calculation and the applying of the modulation pattern.

Figure 1:
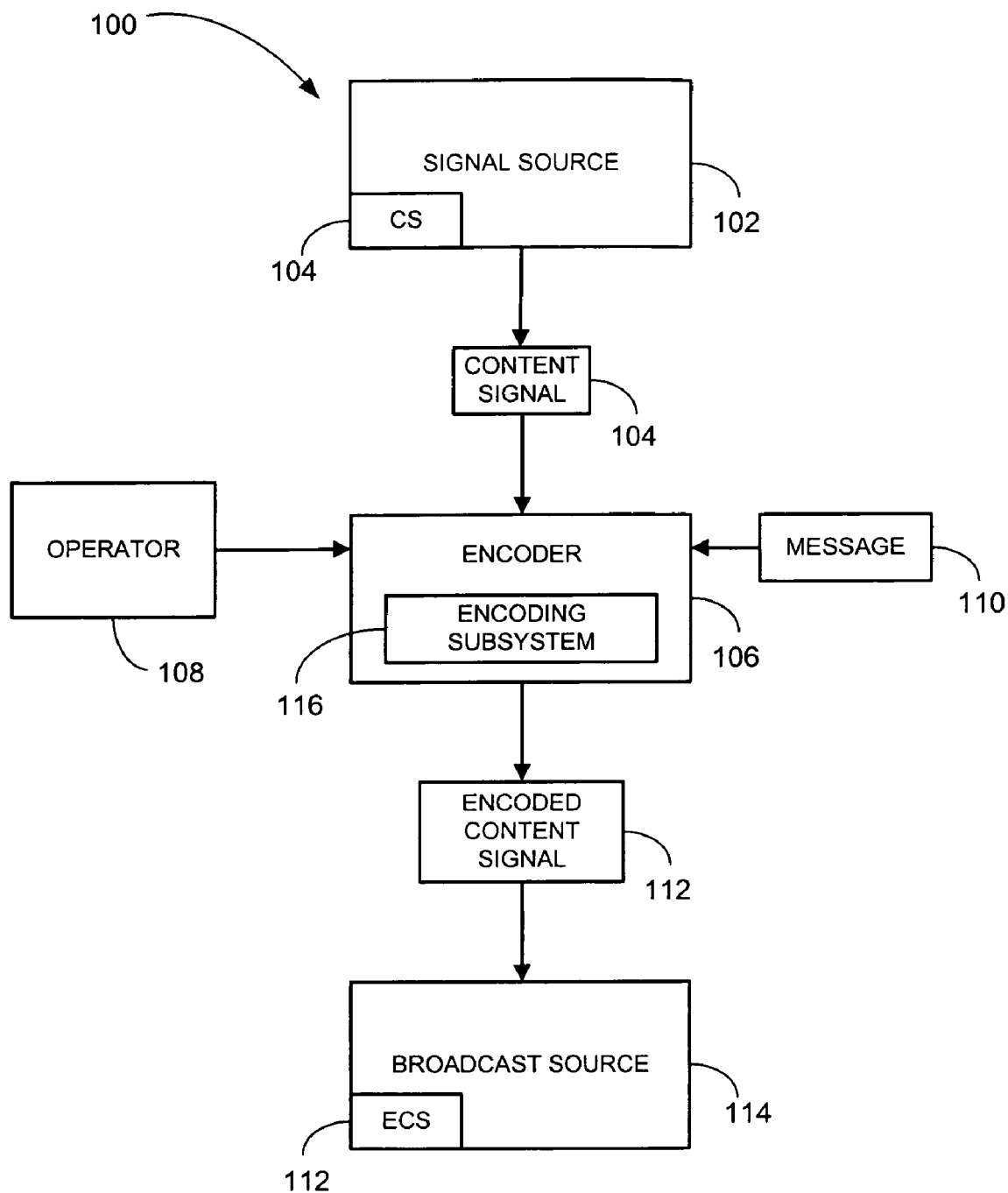
FIG. 1 is a block diagram of an example encoding system according to an example embodiment.

FIG. 1 illustrates an example encoding system 100 according to an example embodiment. The encoding system 100 is an example platform in which one or more embodiments of an encoding method of the present invention may be used. However, other platforms may also be used.

A content signal 104 may be provided from a signal source 102 to an encoder 106 in the encoding system 100. The content signal 104 is one or more images and optionally associated audio. Examples of the content signal 104 include standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, one or more JPEGs (Joint Photographic Experts Group) sequence of bitmaps, or other signal formats that transport of a sequence of images. The form of the content signal 104 may be modified to enable implementations involving the content signals 104 of various formats and resolutions.

The signal source 102 is a unit that is capable of providing and/or reproducing one or more images electrically in the form of the content signal 104. Examples of the signal source 102 include a professional grade video tape player with a video tape, a camcorder, a stills camera, a video file server, a computer with an output port, a digital versatile disc (DVD) player with a DVD disc, and the like.

An operator 108 may interact with the encoder 106 to control its operation to encode a message 110 within the content signal 104, thereby producing an encoded content signal 112 that may be provided to a broadcast source 114. The operator 108 may be a person that interacts with the encoder 106 (e.g., through the use of a computer or other electronic control device). The operator 108 may consist entirely of hardware, firmware and/or software, or other electronic control device that directs operation of the encoder 106 in an automated manner.

The encoded content signal 112 may be provided to the broadcast source 114 for distribution and/or transmission to an end-user (e.g., a viewer) who may view the content associated with encoded content signal 112. The broadcast source 114 may deliver the encoded content signal 112 to one or more viewers in formats including analog and/or digital video by storage medium such as DVD, tapes, and other fixed medium and/or by transmission sources such as television broadcast stations, cable, satellite, wireless and Internet sources that broadcast or otherwise transmit content. The encoded content signal 112 may be further encoded (e.g., MPEG encoding) at the broadcast source 114 prior to delivering the encoded content signal 112 to the one or more viewers. Additional encoding may occur at the encoder 106, the broadcast source 114, or anywhere else in the production chain.

A message 110 may be encoded within the encoded content signal 112. Information included in the message 110 may include, by way of example, a web site address, identification data (e.g., who owns a movie, who bought a movie, who produced a movie, where a movie was purchased, etc.), a promotional opportunity (e.g., an electronic coupon), authentication data (e.g., that a user is authorized to receive the content signal), non-pictorial data, and the like. The message 110 may be used to track content (e.g., the showing of commercials). The message 110 may provide an indication of a presence of rights associated with the encoded content signal 112, provide a promotional opportunity, provide electronic game play enhancement, be a uniform resource locator (URL), be an electronic coupon, provide an index to a database, or the like. Multiple messages 110 may optionally be encoded within the encoded content signal 112. The message 110 may be shared over multiple frames of the encoded content signal 112.

In an example embodiment, the message 110 may be encoded in such a way that the arrangements of the message bits in the frame corresponds to a pattern that is capable of being matched or interpreted as one or more bar codes. The bar code may be one-dimensional such as a UPC bar code. The bar code may be multi-dimensional (e.g., two-dimensional bar codes such as an Aztec code, Data Matrix, Dataglyph, MaxiCode, PDF417, QR Code, Ultra Code or UCC RSS-2D bar code). Other machine readable representations of data in a visual form may also be used.

Encoding of the message 110 may be performed by an encoding subsystem 116 of the encoder 106. An example embodiment of the encoding subsystem 116 is described in greater detail below.

Figure 2:
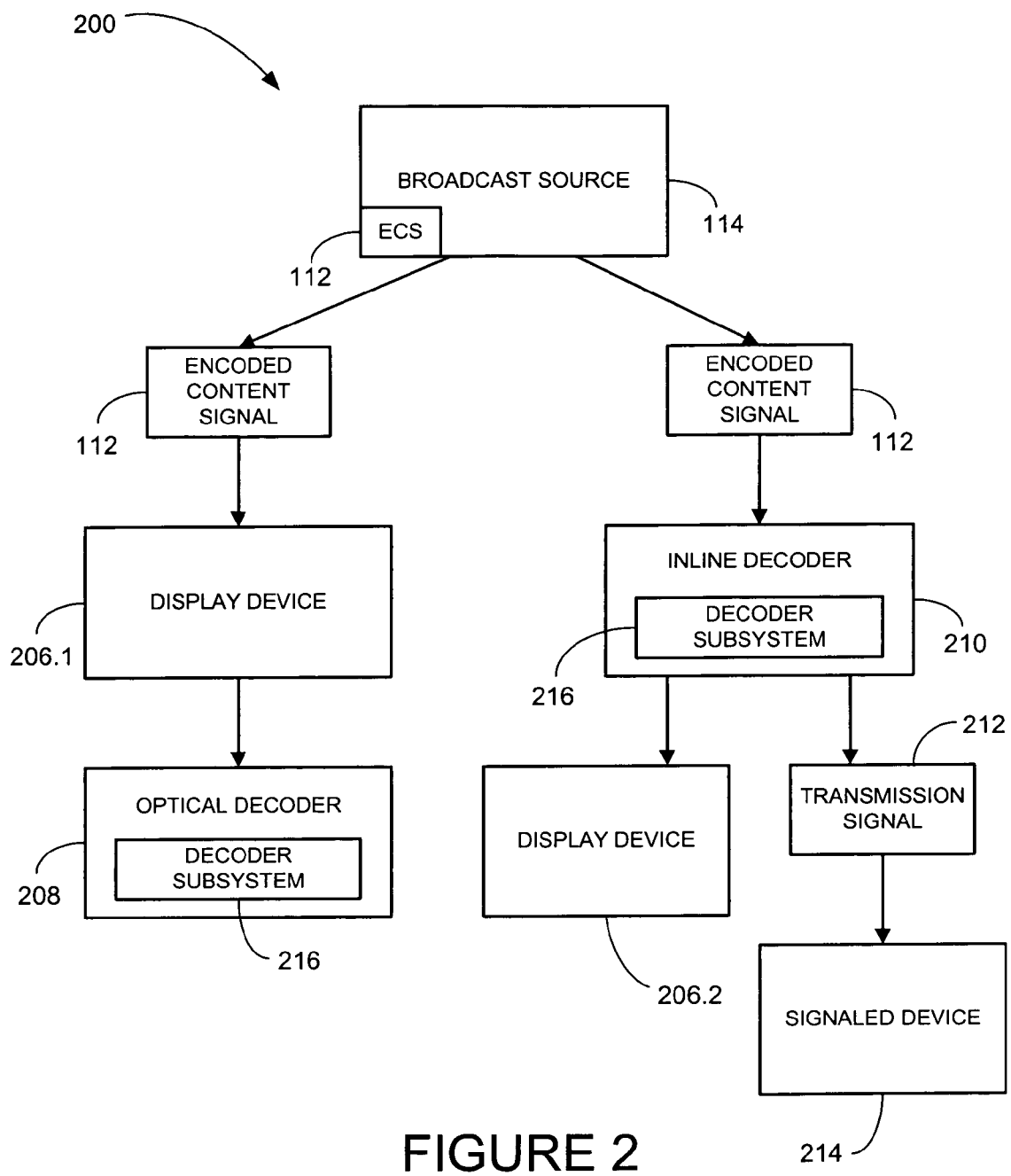
FIG. 2 is a block diagram of an example decoding system according to an example embodiment.

FIG. 2 illustrates an example decoding system 200 according to an example embodiment. The decoding system 200 is an example platform in which one or more embodiments of a decoding method of the present invention may be used. However, other platforms may also be used.

The decoding system 200 may send the encoded content signal 112 from the broadcast source 114 (see FIG. 1) to a display device 206.1 and/or an inline decoder 210. The inline decoder 210 may receive (e.g., electrically) the encoded content signal 112 from the broadcast source 114, and thereafter may transmit a transmission signal 212 to a signaled device 214 and optionally provide the encoded content signal 112 to a display device 206.2.

The inline decoder 210 may decode the message 110 encoded within the encoded content signal 112 and transmit data regarding the message 110 to the signaled device 214 by use of the transmission signal 212 and provide the encoded content signal 112 to a display device 206.2. The transmission signal 212 may include a wireless radio frequency, infrared and direct wire connection, and other transmission mediums by which signals may be sent and received.

The signaled device 214 may be a device capable of receiving and processing the message 110 transmitted by the transmission signal 212. The signaled device 214 may be a DVD recorder, PC based or consumer electronic-based personal video recorder, and/or other devices capable of recording content to be viewed or any device capable of storing, redistributing and/or subsequently outputting or otherwise making the encoded content signal 112 available. For example, the signaled device 214 may be a hand-held device such as a portable gaming device, a toy, a mobile telephone, and/or a personal digital assistant (PDA). The signaled device 214 may be integrated with the inline decoder 210.

An optical decoder 208 may receive and process the message 110 from a display device 206.1. An implementation of the optical decoder 208 is described in greater detail below.

The display device 206.1 may receive the encoded content signal 112 directly from the broadcast source 114 while the display device 206.2 may receive the encoded content signal 112 indirectly through the inline decoder 210. The display devices 206.1., 206.2 may be devices capable of presenting the content signal 104 and/or the encoded content signal 112 to a viewer such as an analog or digital television, but may additionally or alternatively include a device capable of recording the content signal 104 and/or the encoded content signal 112 such as a digital video recorder. Examples of the display devices 206.1., 206.2 may include, but are not limited to, projection televisions, plasma televisions, liquid crystal displays (LCD), personal computer (PC) screens, digital light processing (DLP), stadium displays, and devices that may incorporate displays such as toys and personal electronics.

A decoder subsystem 216 may be deployed in the optical decoder 208 and/or the inline decoder 210 to decode the message 110 in the encoded content signal 112. An example embodiment of the decoder subsystem 216 is described in greater detail below.

Figure 3:
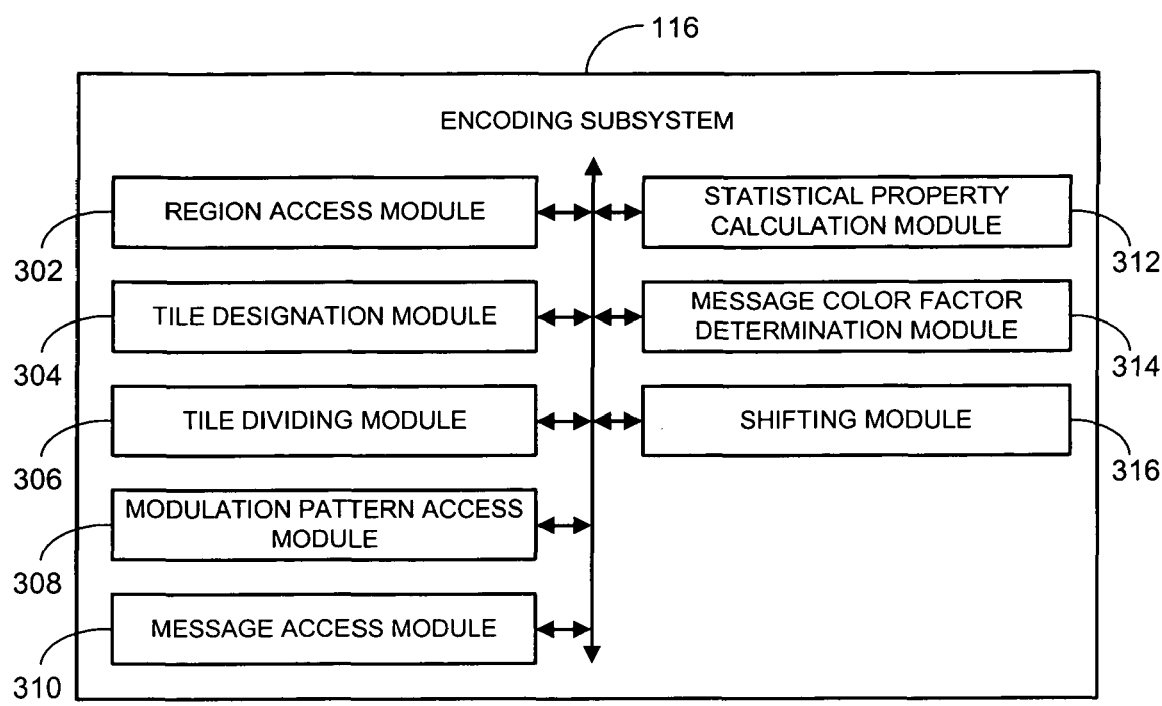
FIG. 3 is a block diagram of an example encoding subsystem that may be deployed in the encoding system of FIG. 1 according to an example embodiment.

FIG. 3 illustrates an example encoding subsystem 116 that may be deployed in the encoder 106 of the encoding system 100 (see FIG. 1) or otherwise deployed in another system.

The encoding subsystem 116 may include a region access module 302, a tile designation module 304, a tile dividing module 306, a modulation pattern access module 308, a message access module 310, a statistical property calculation module 312, a message color factor determination module 314, and/or a shifting module 316. Other modules may also be used.

The region access module 302 accesses a region of a frame (e.g., a source frame). The tile designation module 304 designates a tile within a frame. The tile dividing module 306 divides the tile into one or more bit areas.

The modulation pattern access module 308 accesses a modulation pattern including a number of modulation pattern values. The message access module 310 accesses a message bit value of the message 110 and/or or the message 110.

The statistical property calculation module 312 performs a statistical property calculation on a number of pixel variable values of the number of available pixels within a tile.

The message color factor determination module 314 determines a message color factor for the message 110. The shifting module 316 shifts one or more pixel variable values of a number of pixels in the particular bit area of a target frame to encode one or more message bits.

Figure 4:
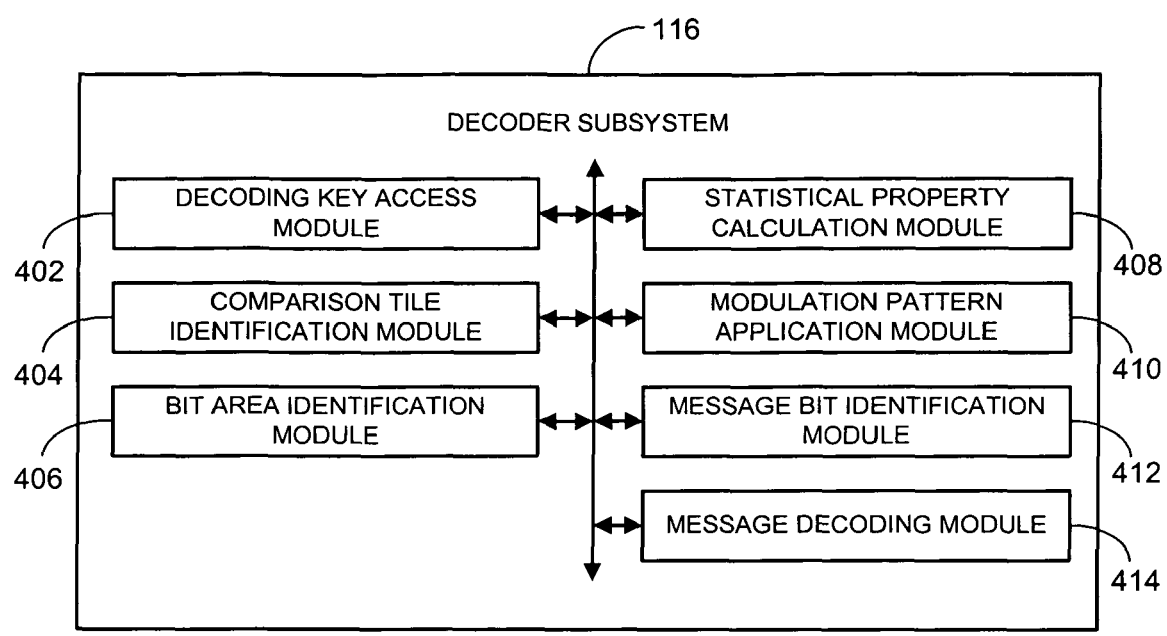
FIG. 4 is a block diagram of an example decoder subsystem that may be deployed in the decoding system of FIG. 2 according to an example embodiment.

FIG. 4 illustrates an example decoder subsystem 216 that may be deployed in the optical decoder 208 and/or the inline decoder 210 of the decoding system 200 (see FIG. 2) or otherwise deployed in another system.

The decoder subsystem 216 may include a decoding key access module 402, a comparison tile identification module 404, a bit area identification module 406, a statistical property calculation module 408, a modulation pattern application module 410, a message bit decoding module 412, and/or a message translation module 414. Other modules may also be used.

The decoding key access module 402 accesses a decoding key. The decoding key may include identification of a comparison tile in a source frame. The comparison tile may include a number of available pixels. The comparison tile identification module 404 identifies a comparison tile within the source frame. The comparison tile may be identified in accordance with the decoding key accessed with the decoding key access module 402.

The bit area identification module 406 identifies one or more bit areas within the comparison tile. The statistical property calculation module 408 performs a statistical property calculation for a number of pixel variable values within the comparison tile. The modulation pattern application module 410 applies a modulation pattern to one or more bit areas of a target frame.

The message bit decoding module 412 decodes one or more message bits in a target frame in accordance with the performing of the statistical property calculation by the statistical property calculation module 408 and the applying of the modulation pattern by the modulation pattern application module 410. The message translation module 414 translates on one or more message bits identified by the message bit identification module 412 over one or more frames into the message 110.

Figure 5:
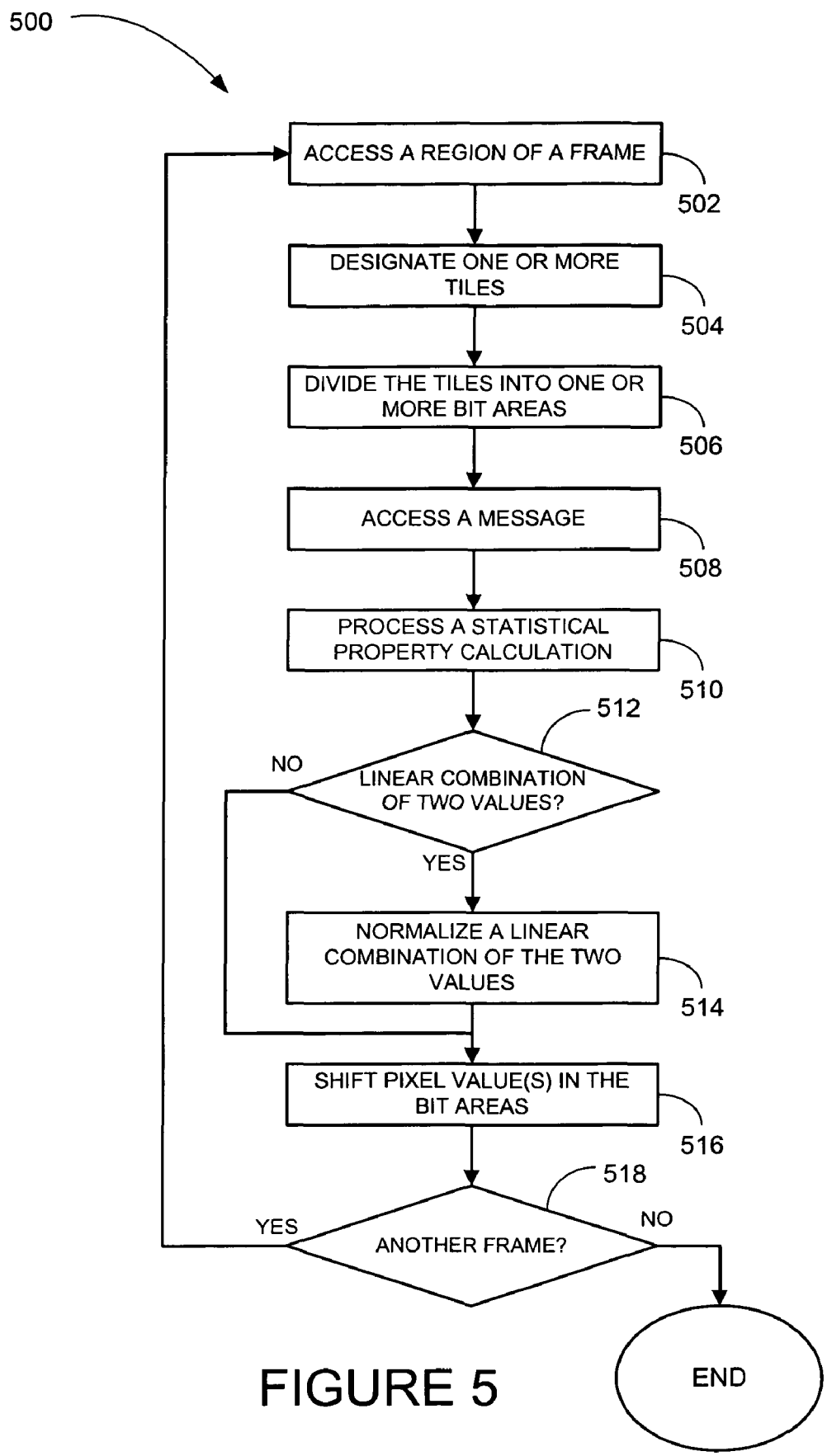
FIG. 5 is a flowchart illustrating a method for content signal encoding in accordance with an example embodiment.

FIG. 5 illustrates a method 500 for content signal encoding according to an example embodiment. The method 500 may be performed by the encoder 106 (see FIG. 1) or otherwise performed.

A region of a frame of the content signal 104 may be accessed at block 502. The region is one or more contiguous or non-continuous portions of a frame containing a number of pixels where encoding may take place. Each of the number of pixels may be associated with a number of pixel variable values. For example, the pixel variable values may be YCrCb (luminance, red chrominance, blue chrominance), RGB (red, green, and blue), or YUV. Other pixel variable values specifying a pixel attribute (e.g., linear or nonlinear combinations of YCbCr, RGB, or YUB) may also be used.

The region may be an entire frame or a portion of the frame. A region may be selected consistently over all frames of the content signal 104, the same region may be selected for a number of frames and then a new region may be selected within the content signal 104, or the region may be varied for the frames of the content signal 104. Changing the region selection for the frames of the content signal 104 may reduce any obtrusiveness of the encoding.

In an example embodiment, the region may be selected within a frame according to an area layout of the frame for the content signal 104. For example, available selections of the region may include a left quadrant, a right quadrant, left top, right top, bottom left, or bottom right. The region selection may vary on occasion or at different frequencies, where more frequent variations may be used to reduce obtrusiveness of the message. By way of an example, the region may be changed more or less frequently than every I-frame of the content signal 104. The same region may be selected for a given I-frame and all frames up to but not including the next I-frame of the content signal. The selection of the same region between I-frames in MPEG encoding may minimize disruption of MPEG data compression while maximizing an encoded data transmission rate.

One or more tiles may be designated in the region at block 504. The tile may be a frame selection that includes an entire region or a portion of a region (e.g., a subregion) of the frame. Different tiles may optionally be selected in a same frame for different pixel variable values (e.g., luminance, red chrominance and blue chrominance). The tile is a partial portion or an entire portion of one or more regions of a frame over which a statistical property calculation may be performed. For example, the statistical property calculation may include statistical calculations of means, variances, covariances and/or standard deviations for one or more of pixel variable values of a tile.

The tiles selected over a number of frames of the content signal 104 may be equal in size or may be differently sized. For example, the tiles may be a first size for a first pixel channel (e.g., red and blue chrominance) within the content signal 104 and a second differing size for a second pixel channel (e.g., luminance) within the same content signal 104.

Each tile may be divided into one or more bit areas at block 506. A bit area is part of or an entire tile within which one message bit of the message 110 may be encoded. Additional bits may be used to allow for improved data retrieval on decoding.

The arrangement of the bit areas in the frame may be in a square array or a hexagonal array. However, other types of regular and irregular patterns (e.g., derived from one or two dimensional bar codes) may also be used. The bit areas may include dots as a resulting of the encoding.

The bit area may optionally be the size of an MPEG block (e.g., 8×8 or 16×16) but is not so limited. By way of example, if a tile of 80×80 pixels is divided by 10 horizontally and by 10 vertically, the tile may include 100 bit areas each of which is 8×8 pixels in size.

In an example embodiment, a 16×16 chrominance macro block for the bit area may be selected and a 32×32 luminance macro block of the bit area may be selected. However, any other size or shape bit areas may also be used. For example, bit areas need not be square.

The bit areas selected over the frames of the content signal 104 may be equal in size or may be differently sized. For example, the bit areas may be a first size for a first channel (e.g., red and blue chrominance) within the content signal and a second differing size for a second channel (e.g., luminance) within the same content signal.

The message 110 may be accessed at block 508. Each instance of the message 110 to be encoded in the content signal 104 may contain between approximately five hundred to approximately one thousand message bits per frame, although a greater number or lesser number of message bits may also be used. The message bits may be part of a bit stream and may be used to represent the message 110.

The message 110 may be encoded with extra bits to facilitate or enable error correction during decoding. For example, the extra bits may be, but are not limited to, parity bits used by the Reed-Solomon technique or Data Matrix for error checking, or extra bits used to enable Manchester encoding. The use of the extra bits for error checking may enable a less obtrusive transmission of the message 110 within the content signal 104 by allowing the changes to pixel variable values involved in encoding to be made at low amplitude.

A statistical property calculation for at least one pixel variable value may be performed for the one or more tiles in the region at block 510 as one input for calculation of one or more shift values. The at least one pixel variable value may be color values (e.g., the Cb, the Cr, the blue chrominance, the red chrominance) and/or a luminance value. For example, a statistical property calculation may be performed and used to obtain a linear combination of two color values. An example embodiment of performing the statistical property calculation is described in greater detail below. The statistical property calculation may be used to calculate the amount of dispersion in pixel variable values in a frame in which the message 110 is to be encoded.

At decision block 512, a determination may be made as to whether the calculated value of the statistical property calculation is a linear combination of two values. If a determination is made that the calculated value is a linear combination of two values, the linear combination of the calculated value may be normalized at block 514 to specify the relative strength of encoding in the two sets of pixel variable values. For example, the linear combination of the color values may be normalized.

If a determination is made that the calculated value is not a linear combination of two values at decision block 512 or upon completion of the operations at block 514, the method 500 may proceed to block 516.

At block 516, the pixel values of a plurality of pixels may be shifted in accordance with the shift value. The shift value may be calculated from at least one pixel variable value within a tile. The shifting of the color may create a shape in a bit area specified by the modulating pattern (e.g., a dot). An example embodiment of shifting the pixel values in the bit areas is described in greater detail below.

A determination may be made at decision block 518 whether another frame of the content signal 104 may be accessed. For example, another frame accessed may be a next consecutive frame of the content signal 104 and/or a frame selected for encoding. If a determination is made to access another frame, the method 500 may return to block 502. If a determination is made at decision block 518 not to access another frame, the method 500 may terminate.

In an example embodiment, the method 500 may encode the same data for several frames before a shift occurs. In an example embodiment, the method 500 may also be used with a number of shift values. For example a shift value may be calculated separately for the luminance value and the at least one color value, and the shift for the luminance value and the at least one color value may occur in the same or different bit areas.

Figure 6:
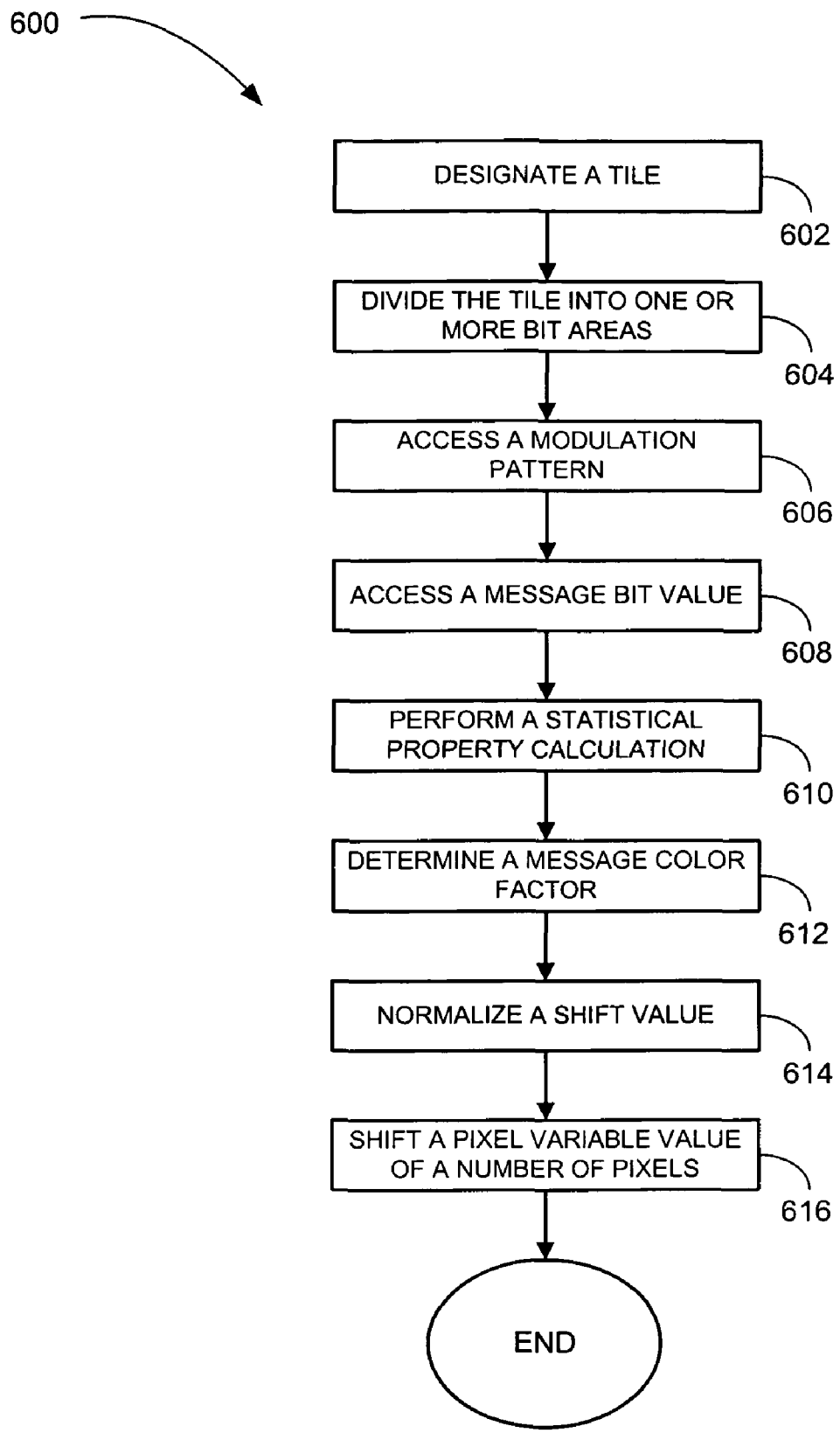
FIG. 6 is a flowchart illustrating a method for frame encoding in accordance with an example embodiment.

FIG. 6 illustrates a method 600 for frame encoding according to an example embodiment. The method 600 may be performed by the encoder 106 (see FIG. 1) or otherwise performed.

A tile is designated within a source frame (e.g., of the content signal 104) at block 602. The tile may include a number of available pixels. At block 604, the tile is divided into one or more bit areas. A bit area may be capable of being encoded with a message bit.

A modulation pattern including a number of modulation pattern values is accessed at block 606. The modulation pattern may be defined for each pixel value corresponding to each pixel of a bit area and may have values that are positive or negative. It may, but need not, be chosen to have values that are generally smaller near the edges of the bit area. For example, in encoding an amount that is proportional to the modulation pattern may be applied over the bit area so that the edges of the bit area have the least amount of shift while the center of the bit area has the greatest amount of shift.

The modulation pattern may be a two-dimensional Gaussian function (power 2) or pseudo-Gaussian function (power other than 2) but is not so limited. In an example embodiment, a message bit may be encoded by incrementing or decrementing pixel values by an amount that varies across the bit area (e.g., by an amount proportional to the modulation pattern).

The modulation pattern may be selected to minimize intrusiveness and/or for robustness against compression. In an example embodiment, the discrete cosine transform (DCT) space may be used to aid in designing a modulation pattern for robustness against compression or other desired features. For example, a real space pattern may be imported into DCT space, high frequency components that are not resistant to compression and/or low frequency components that are more visible may be removed leaving the medium range components. The resulting pattern in DCT space may be converted back into real space and the real space result may be used as the modulation pattern for encoding.

In an example embodiment, a scaling distance of the modulation pattern (e.g., the standard deviation when the modulation pattern is the Gaussian function) may be selected so that a value from the modulation pattern falls off to almost zero near the edges of the bit area. For example, the scaling distance may be selected as one quarter to one sixth of the size of the bit area, but other scaling distances may also be used.

A message bit value of the message 110 is accessed at block 608. For example, the corresponding position of the message 110 may indicate that a black pixel (e.g., a value of zero) or white pixel (e.g., a value of one) from the message is to be encoded in the bit area. The message bit value may be a value of one if the corresponding position of the message 110 indicates that a black pixel is to be encoded, and the message bit may be a value of negative one if the corresponding position of the message 110 indicates that a white pixel is to be encoded. The correspondence with the black pixel and a positive one and the white pixel and a negative one may be reversed so that the white pixel corresponds with the positive one and the black pixel with the negative one and other values beyond one may be used. For example, a "0" data bit may be encoded by decrementing a chosen variable and encoded a "1" by incrementing it, or vice versa.

At block 610, a statistical property calculation is performed on one or more pixel variable values of the number of available pixels within the tile.

A message color factor may be determined for the message 110 at block 612.

A shift value may be normalized at block 614. The shift value may be in accordance with the statistical property calculation, the particular message bit value, a particular modulation pattern value of the number of modulation pattern values for the particular pixel within the particular bit area, and/or a message color factor.

At block 616, one or more pixel variable values of a number of pixels in the one or more bit areas of a target frame may be shifted to encode a message bit in each of the one or more bit areas. A pixel variable value may be shifted by a shift value (or a normalized shift value).

The target frame may be the source frame or a different frame in which the one or more bits are shifted. The target frame may be a preceding frame or subsequent frame in the content signal 104. The target frame may have substantially similar properties to source frame. The similar properties may include, by way of example, similar pixel variable values and/or comparable tiles.

Figure 7:
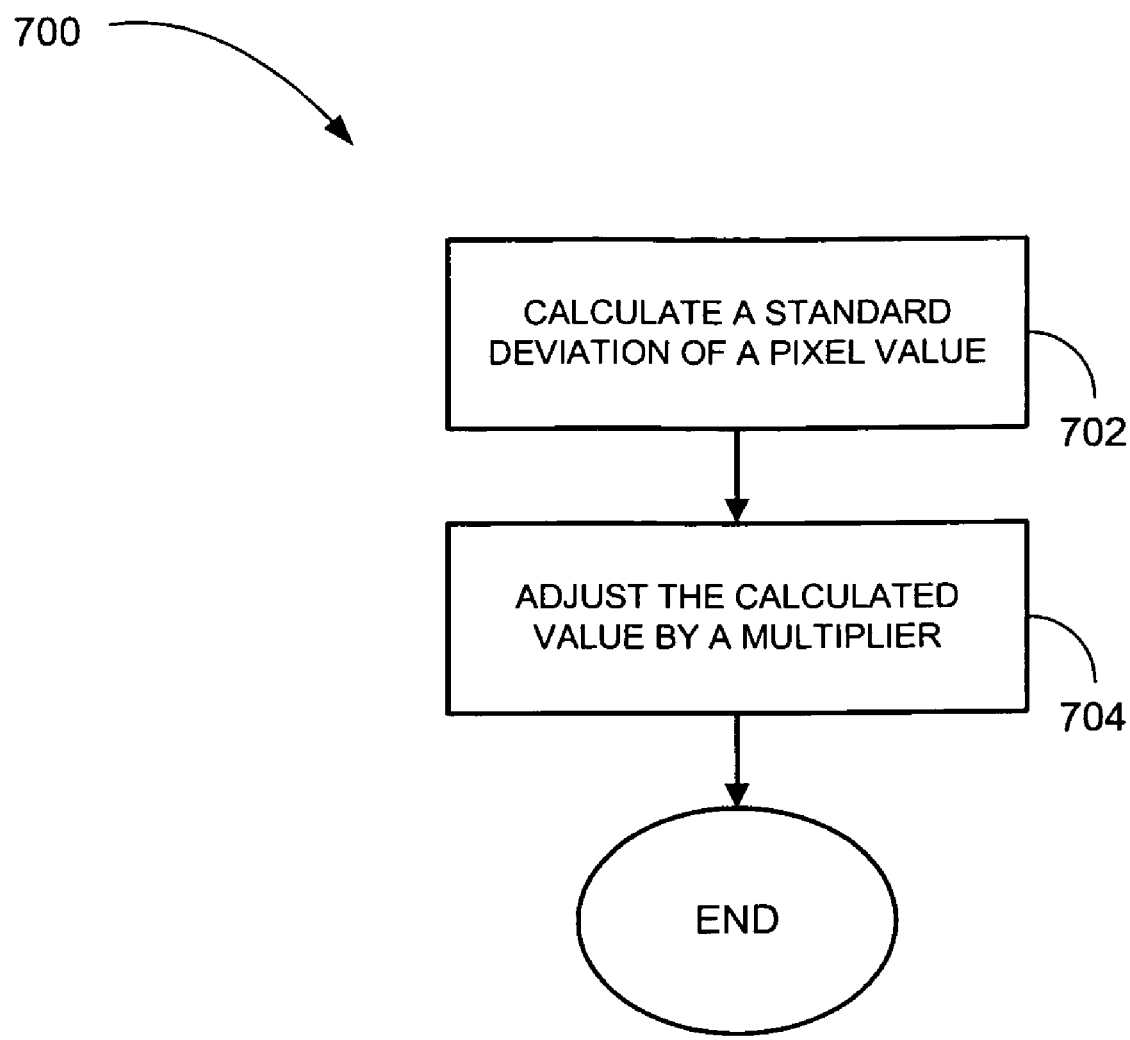
FIGS. 7 and 8 are flowcharts illustrating a method for processing a statistical property calculation in accordance with an example embodiment.

FIG. 7 illustrates a method 700 for processing a statistical property calculation according to an example embodiment. The method 700 may be performed at block 510, block 610, or otherwise performed.

A standard deviation of a pixel variable value may be calculated for a tile at block 702. For example, the standard deviation of luminance, red chrominance, or blue chrominance may be calculated for a tile. The calculated value may be adjusted by a multiplier at block 704.

Figure 8:
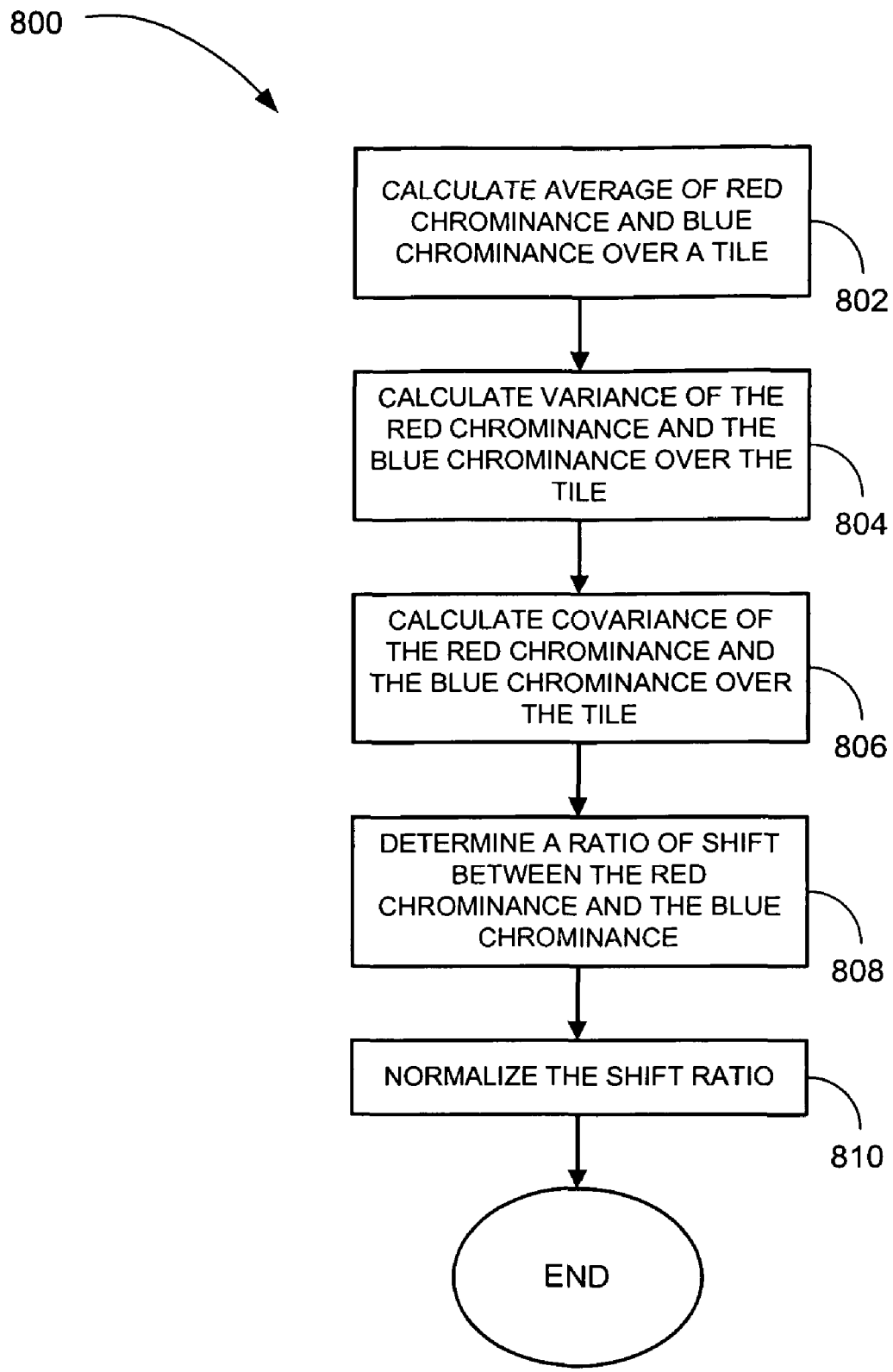

FIG. 8 illustrates a method 800 for processing a statistical property calculation according to an example embodiment is illustrated. The method 700 may be performed at block 510, block 610, or otherwise performed.

A red chrominance average and a blue chrominance average may be calculated for a tile at block 802. For example, the red chrominance average may be calculated by taking an average of red chrominance over a tile, while the blue chrominance average may be calculated by taking an average of blue chrominance over the tile.

In an example embodiment, designation of the region into tiles that are smaller than the entire frame for the statistical property calculation as opposed to performing the calculation over the entire frame may enable shifting by a smaller amount of some combination of red chrominance and blue chrominance or luminance in the case of encoding in luminance) while still being able to recover the message. The selection of a smaller tile may provide for less variation in chrominance or luminance over each individual tile as compared to the variation over the entire frame.

A red chrominance variance (e.g., a variance or dispersion of the red chrominance) and a blue chrominance variance (e.g., a variance or dispersion of the blue chrominance) may be calculated for the frame selection at block 804. The red chrominance variance may be calculated by determining a variance or dispersion of the red chrominance, and a blue chrominance variance may be calculated by determining a variance or dispersion of the blue chrominance. The standard deviation may also be derived from the variance. A covariance may be calculated for the red chrominance and the blue chrominance at block 806.

A color ratio specifying the proportions of red and blue chrominance values in a linear combination of those values may be determined at block 808. In an example embodiment, using the color ratio as part of the shift value may minimize the standard deviation of the linear combination of the red and blue chrominances over the potential linear combinations (e.g., all potential linear combinations) for that tile of the frame. For example, the selection of the color ratio may minimize the amount of relative adjustment made to the red chrominance and blue chrominance (e.g., to limit obtrusiveness). The color ratio may be normalized (e.g., so that the amplitude is one) at block 810.

While the method 800 is described in terms of the red chrominance and blue chrominance, any two pixel variable values of the pixels may be used.

Figure 9:
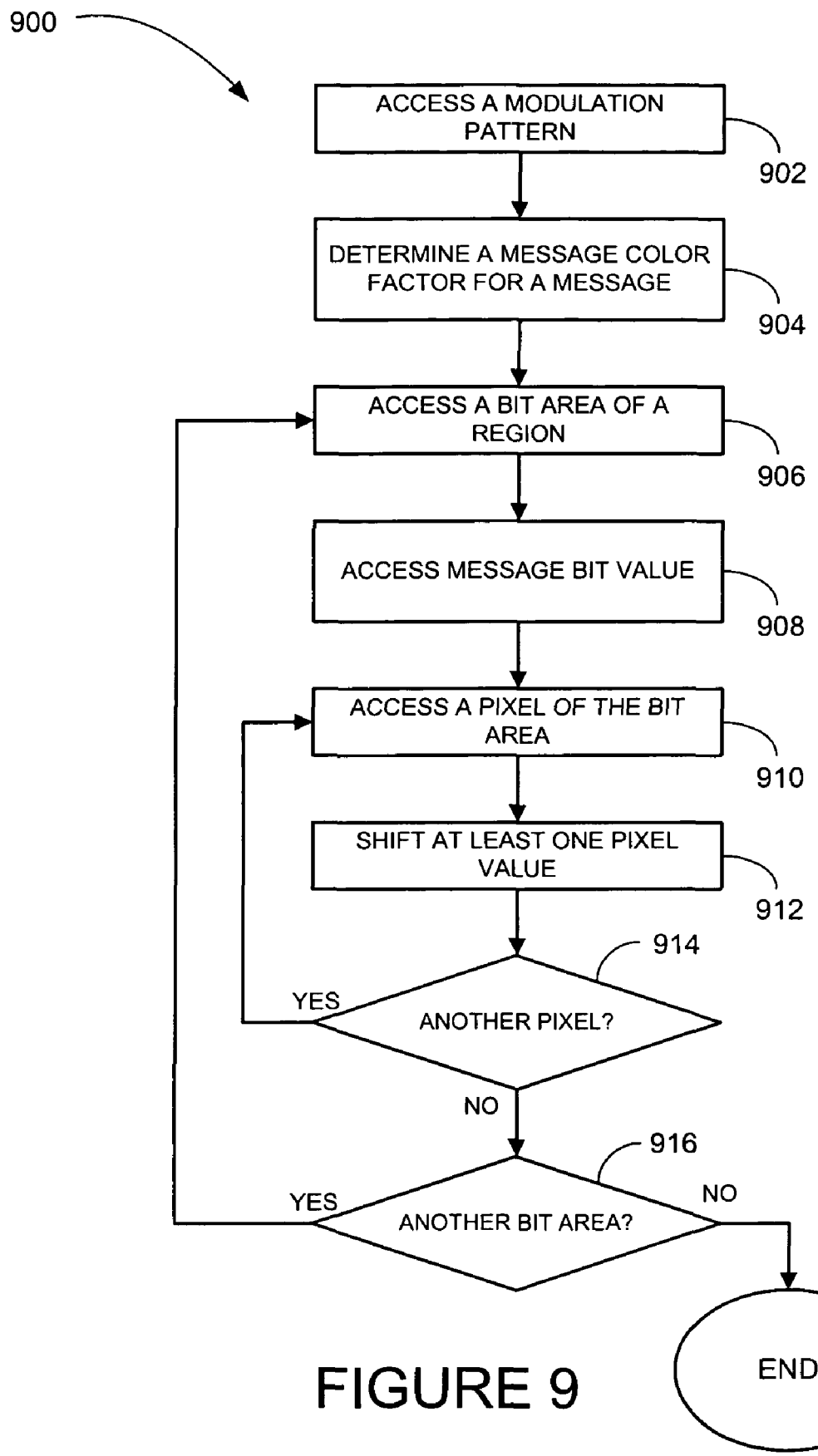
FIG. 9 is a flowchart illustrating a method for pixel variable value shifting in accordance with an example embodiment.

FIG. 9 illustrates a method 900 for pixel variable value shifting according to an example embodiment. The method 900 may be performed at block 516 or block 616 (see FIGS. 5 and 6).

A modulation pattern may be accessed at block 902.

A message color factor may optionally be determined for a message 110 at block 904. The message color factor may take into consideration a relative number of white bits and black bits in the message 110. For example, the message color factor may be applied by dividing by a number proportional to the number of white bits to be encoded in the tile for a white bit and dividing by a number proportional to the number of black bits to be encoded in the tile for a black bit. In an example embodiment, the use of the message color factor may enable the mean value of the red chrominance and the blue chrominance and/or the luminance to remain the same after encoding.

A bit area of a region may be accessed at block 906. A message bit value may be accessed at block 908.

A pixel of the bit area may be accessed at block 910. At least one pixel variable value may be shifted at block 912 according to one or more shift factors. The shifting of the at least one pixel variable value of a number of pixels may encode the content signal 104 at a spatial frequency where eye is less sensitive (e.g., more insensitive) to variations in chrominance and/or luminance.

In an example embodiment, shifting the red chrominance and the blue chrominance during the operations of block 912 may create a dot (e.g., one or more pixels having a greatest amount of chrominance adjustment) that may be detected during decoding but may be substantially invisible to human eyes.

At decision block 914, a determination may be made as to whether another pixel of the bit area may be accessed. If a determination is made to access another pixel, the method 900 may return to block 910. If a determination is made at decision block 914 not to access another pixel, the method 900 may proceed to decision block 916.

A determination may be made at decision block 916 as to whether another bit area of the region may be accessed. If a determination is made to access another bit area, the method 900 may return to block 906. If a determination is made at decision block 916 not to access another bit area, the method 900 may terminate.

Figure 10:
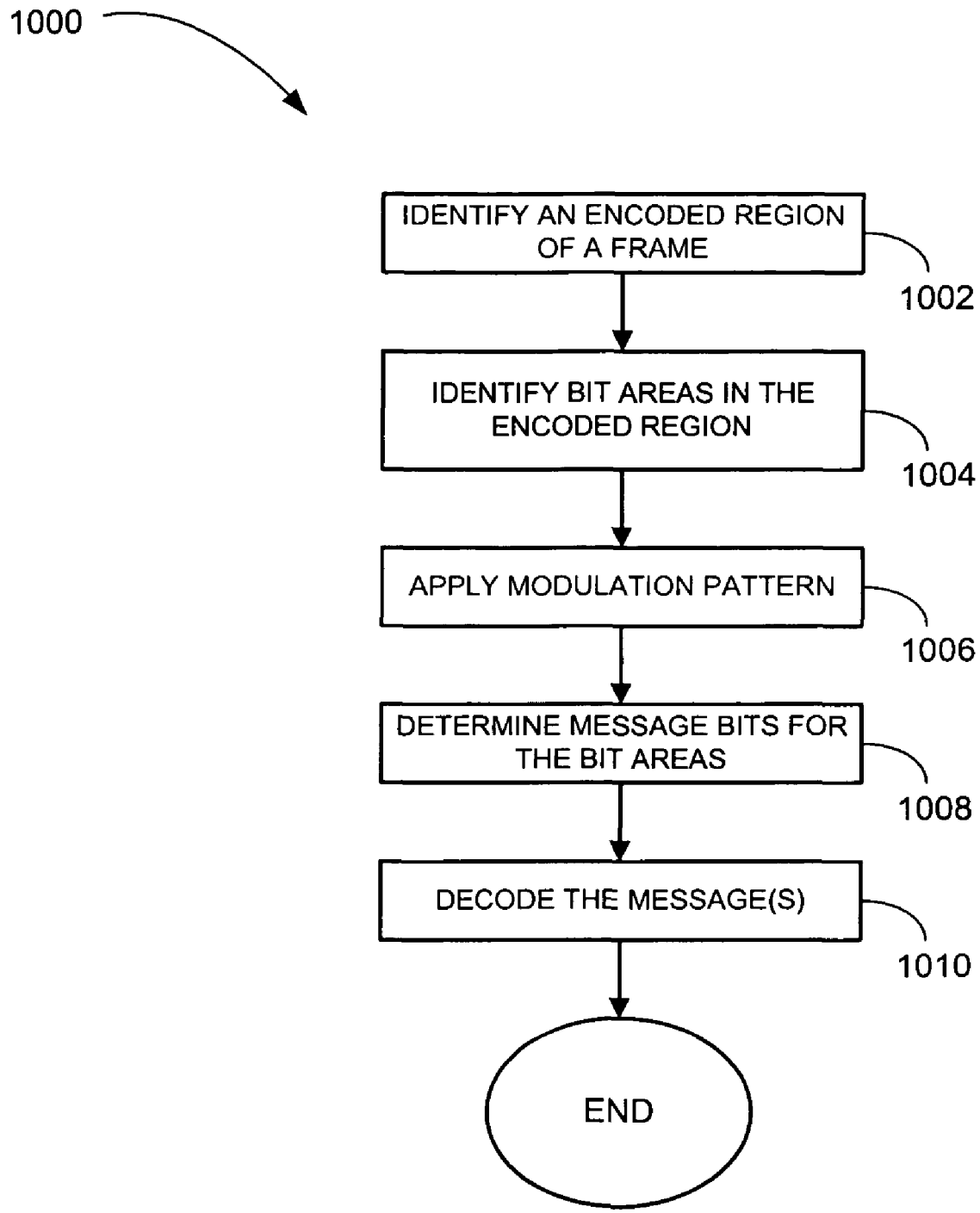
FIG. 10 is a flowchart illustrating a method for message decoding in accordance with an example embodiment.

FIG. 10 illustrates a method 1000 for message decoding according to an example embodiment. The method 1000 may be performed by the optical decoder 208, the inline decoder 210 (see FIG. 2), or otherwise performed.

An encoded region of a frame (e.g., of the encoded content signal 112) may be identified at block at block 1002. The encoded region may, by way of example, be identified using Fast Fourier transforms, by using identifiable regions on a display, by using a visible or substantially invisible test pattern, or by identifying the edges of a TV screen using the property that the luminance of a TV screen may be higher than the luminance of a surrounding area. Other methods for identifying an encoded region of a frame or several methods in combination may also be used.

One or more bit areas of the encoded region may be identified at block 1004. For example, the bit areas may be identified by having knowledge of the size of a bit area and using the bit area size to identify the bit areas in the region.

A modulation pattern may be applied to the one or more bit areas of the encoded region at block 1006. For example, the modulation pattern may be a modulation pattern used during encoding or a pattern similar to the modulation pattern used during encoding. An example embodiment of applying the modulation pattern is described in greater detail below.

Message bits may be determined for the bit areas at block 1008. An example embodiment of determining the message bits is described in greater detail below.

One or more messages 110 may be obtained by decoding the message bits from the encoded content signal 112 at block 1010.

Figure 11:
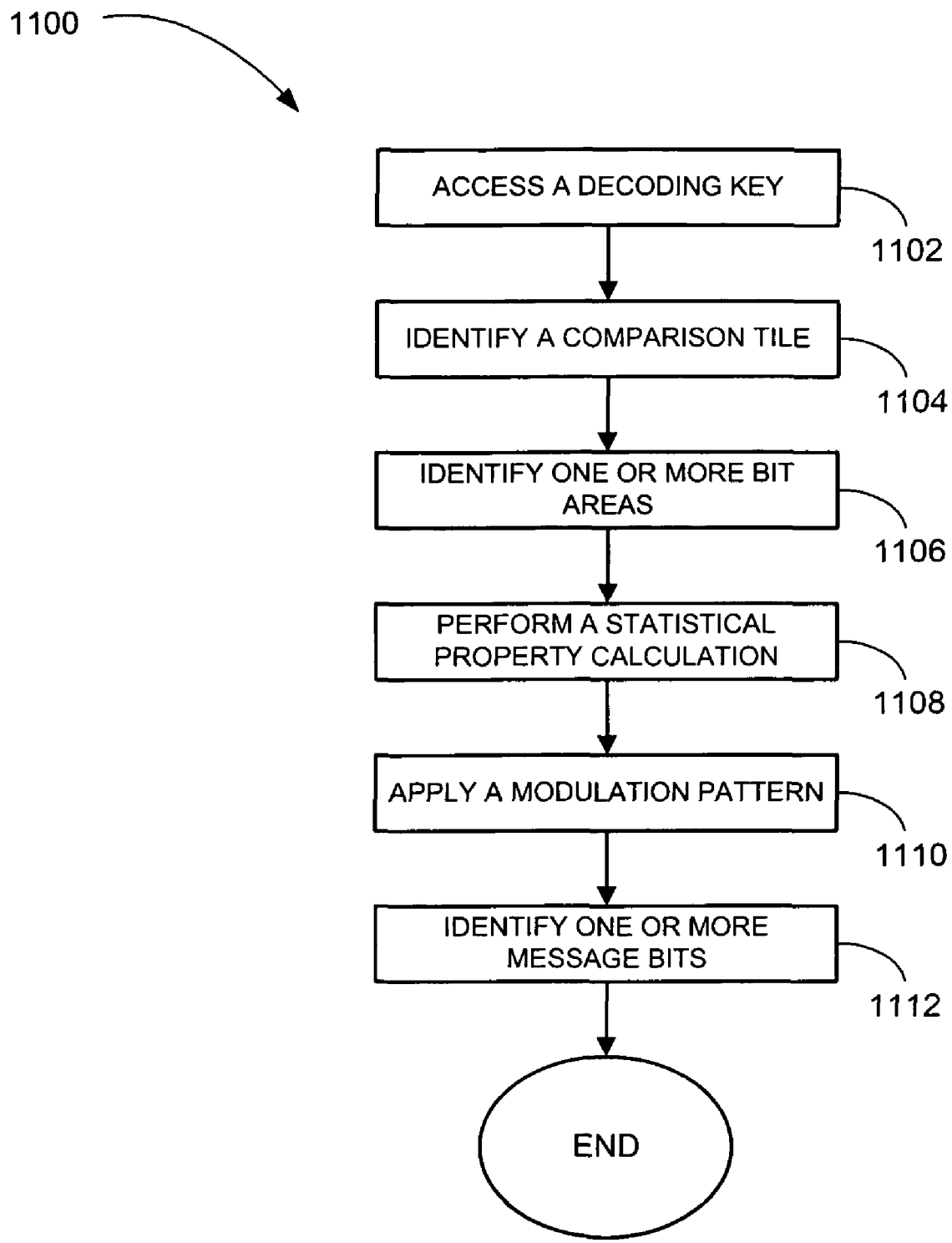
FIG. 11 is a flowchart illustrating a method for message bit decoding in accordance with an example embodiment.

FIG. 11 illustrates a method 1100 for message bit decoding according to an example embodiment. The method 1100 may be performed by the optical decoder 208, the inline decoder 210 (see FIG. 2), or otherwise performed.

A decoding key may be accessed at block 1102. The decoding key may include identification of the comparison tile in the source frame.

A comparison tile is identified within a source frame at block 1104. The comparison tile may include a number of available pixels. The comparison tile may be identified in accordance with the decoding key or otherwise identified.

At least one bit area is identified within the comparison tile at block 1106. A bit area may be capable of being encoded with a message bit. The message bit may be associated with the message 110.

At block 1108, a statistical property calculation is performed for a number of pixel variable values within the comparison tile.

A modulation pattern is applied to at least one bit area of a target frame at block 1110.

At block 1112, one or more message bits are identified in a target frame in accordance with the performing of the statistical property calculation and the applying of the modulation pattern. The target frame may be the source frame or a different frame in which the one or more bits are shifted. The target frame may be a preceding frame or subsequent frame in the content signal 104. The target frame may have substantially similar properties to source frame. The similar properties may include, by way of example, similar pixel variable values and/or comparable tiles.

Figure 12:
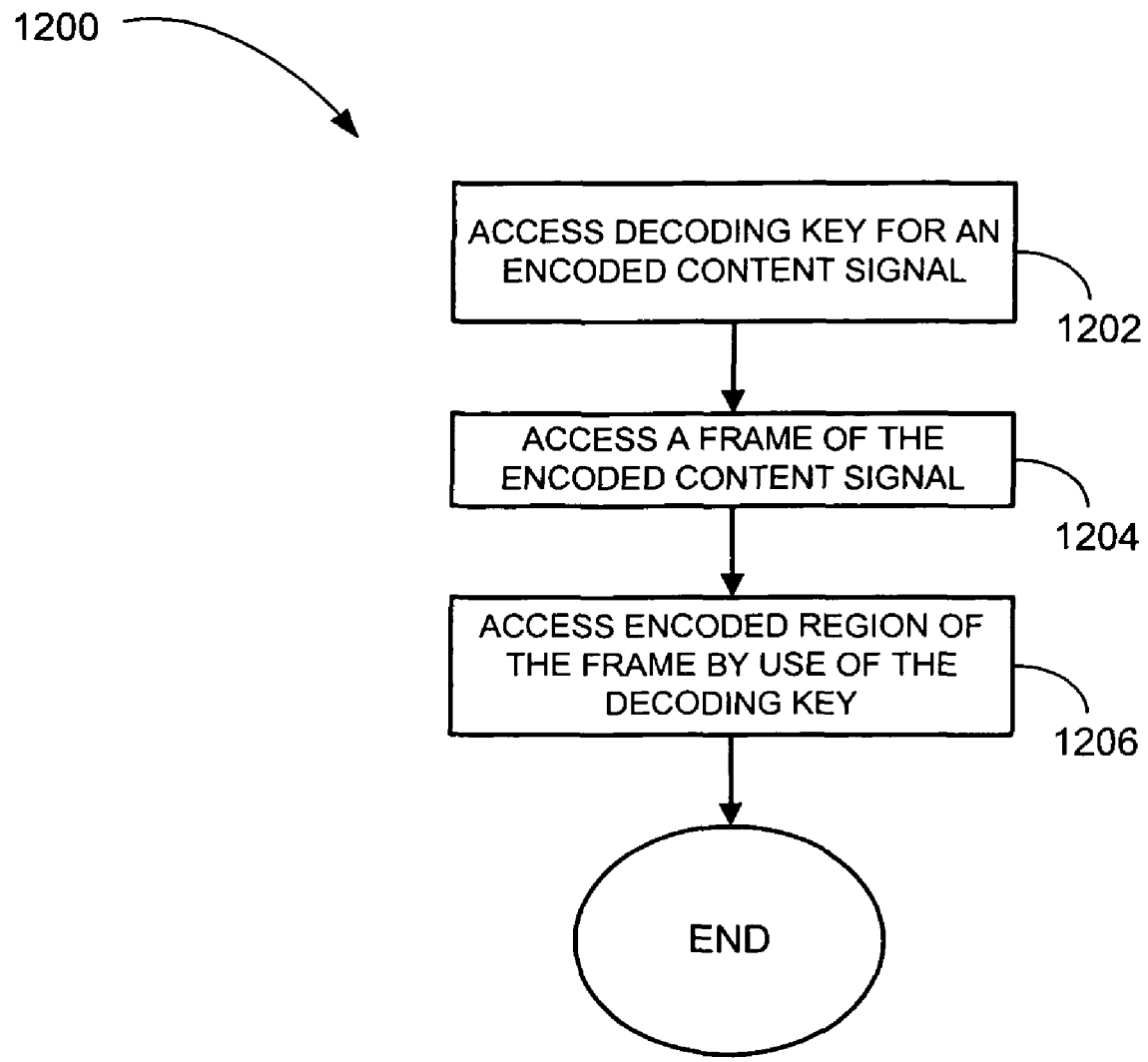
FIG. 12 is a flowchart illustrating a method for encoded region identification in accordance with an example embodiment.

FIG. 12 illustrates a method 1200 for encoded region identification according to an example embodiment is illustrated. The method 1200 may be performed at block 1002 (see FIG. 10) or otherwise performed.

A decoding key may be accessed for the encoded content signal 112 at block 1202. For example, the decoding key may be software and/or hardware available to or embodied in a detector that identifies the encoded region in the frames of the encoded content signal 112. The decoding key may include, by way of an example, the modulation pattern, the positions of the region and tiles within the frames, how many bits are being encoded, the size and shape of the bit areas, the spatial orientation of the encoding, specification of which of the one or more pixel variable values have been used in the encoding, whether optimal or fixed combinations of pixel variable values are used, and the like. The decoding key may also include other components to be used to decode the message 110 in the encoded content signal 112.

A frame of the encoded content signal 112 may be accessed at block 1204. An encoded region of the frame may be accessed by use of the decoding key at block 1206.

Figure 13:
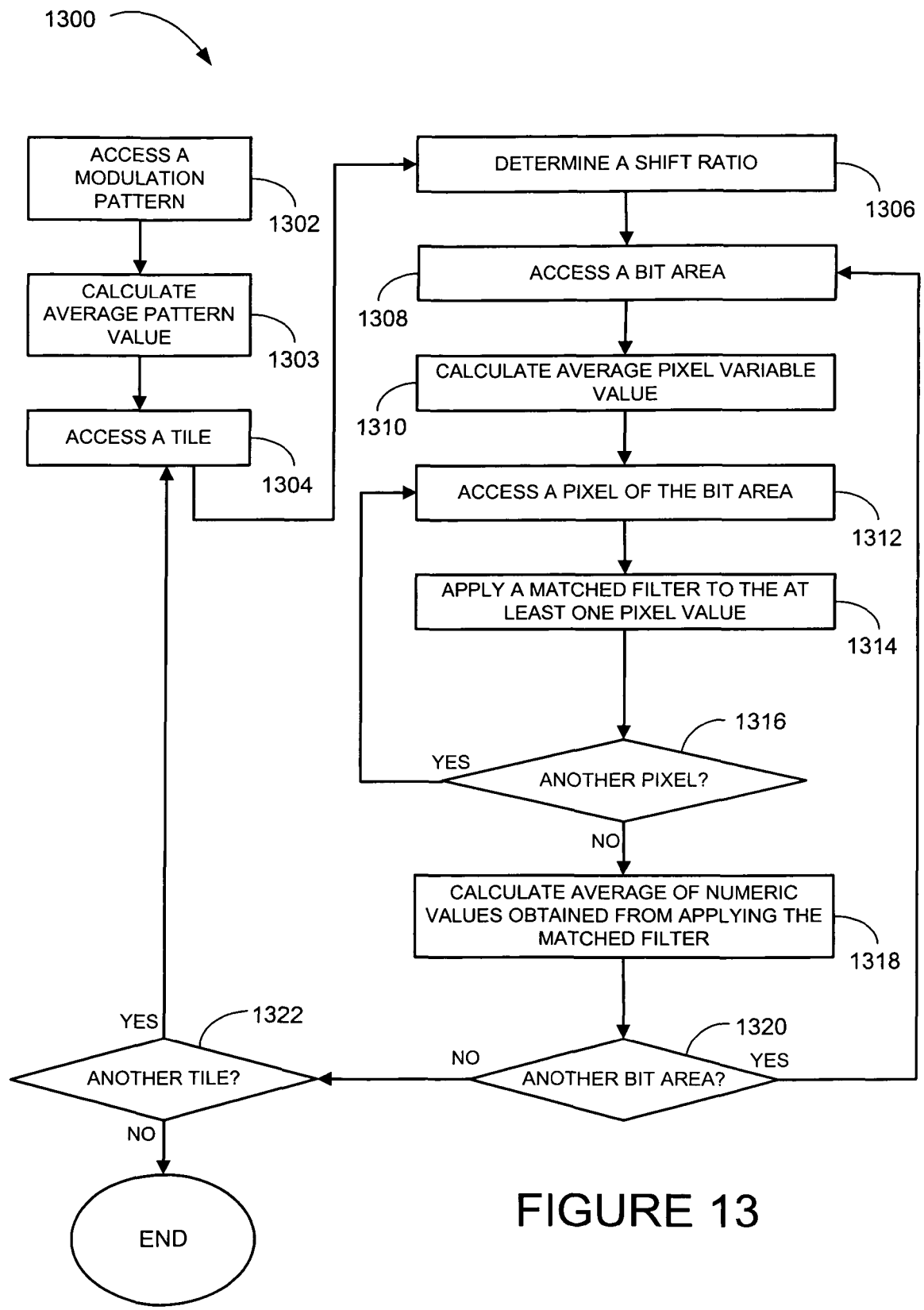
FIG. 13 is a flowchart illustrating a method for modulation pattern application during decoding in accordance with an example embodiment.

FIG. 13 illustrates a method 1300 for modulation pattern application during decoding according to an example embodiment. The method 1300 may be performed at block 1006, at block 1106, or otherwise performed.

A modulation pattern may be accessed at block 1302. For example, the modulation pattern may be accessed from the decoding key or otherwise determined. In an example embodiment, other information used to decode the encoded content signal 112 may also be obtained from the decoding key. The modulation pattern may be the modulation pattern used to modulate the content signal 104, or may be a pattern that is similar and/or correlated to the modulation pattern used to modulate the content signal 104.

The average pattern value of the pattern value may be calculated over the tile at block 1303.

A tile of the frame may be access at block 1304. The tile may be accessed from the decoding key, may be determinable, or may otherwise be available.

A shift ratio may be determined for the tile at block 1306. The shift ratio may be calculated by performing a statistical property calculation as described in greater detail above.

In an example embodiment, the shift ratio may be adjusted to account for the changes to the pixel variable values introduced by the encoding process. The adjusted shift ratio may more accurately reflect the values used during the encoding process.

A bit area may be accessed at block 1308. The average pixel variable value of the at least one pixel value may be calculated over the tile at block 1310.

A pixel of the bit area may be accessed at block 1312. A matched filter may be applied to the at least one pixel variable value of the pixel and block 1314. For example, the modulation pattern may be applied as a matched filter. The modulating pattern, minus its average over the bit area, may optionally be used as the matched filter during the operations at block 1314. The average pixel variable value of the linear combination of the at least one pixel variable value selected may optionally be subtracted from the at least one pixel variable value of the pixel from the linear combination during the operations at block 1314.

In an example embodiment, applying the matched filter may include for each pixel subtracting the average pixel variable value (over the bit area) from the pixel variable value for the pixel and multiplying the result by the result of subtracting the average pattern value (over the bit area) from the pattern value for the pixel to obtain a numeric value.

In an example embodiment, the encoded data may be received by convolving a chosen variable with a matching filter that has a similar functional form across the bit area as the encoded amount during encoding and/or by another filter that compares a mean value of the chosen variable in portions of the data bit area where it is incremented or decremented by a comparatively large amount to encode data to values of that variable in portions of the data bit area where it is incremented or decremented less or not at all.

At decision block 1316, a determination may be made as to whether another pixel of the bit area may be accessed. If a determination is made to access another pixel, the method 1300 may return to block 1312. If a determination is made at decision block 1316 not to access another pixel, the method 1300 may proceed to block 1318.

An average may be calculated from the numerical values obtained by applying the matched filter at block 1318. The filtered average may be used to determine whether the at least one pixel variable value in the bit area were on average raised or lowered.

In an example embodiment, the function may be (L-Lav) (p-pav) where L is at least pixel variable value, Lav is the average of the at least pixel variable value over the bit area, p is the pattern value for that pixel and pav is its average over the bit area. When a resulting value is >0, the message bit may be assumed to be a white bit; otherwise the message bit may be assumed to be a black bit. Bit areas that include message bits further from zero may in general be more likely to be correct and the values may be stored as a metric to be used to determine the probability that the message bit is correct. For example, this probability may be used by an error correcting code to improve content retrieval.

A determination may be made at decision block 1320 as to whether another bit area may be accessed. If a determination is made to access another bit area, the method 1300 may return to block 1308. If a determination is made at decision block 1320 not to access another bit area, the method 1300 may proceed to decision block 1322.

At decision block 1322, a determination may be made as to whether another tile may be accessed. If another tile may be accessed, the method 1300 may return to block 1304. If a determination is made that another tile may not be accessed at decision block 1322, the method 1300 may terminate.

Figure 14:
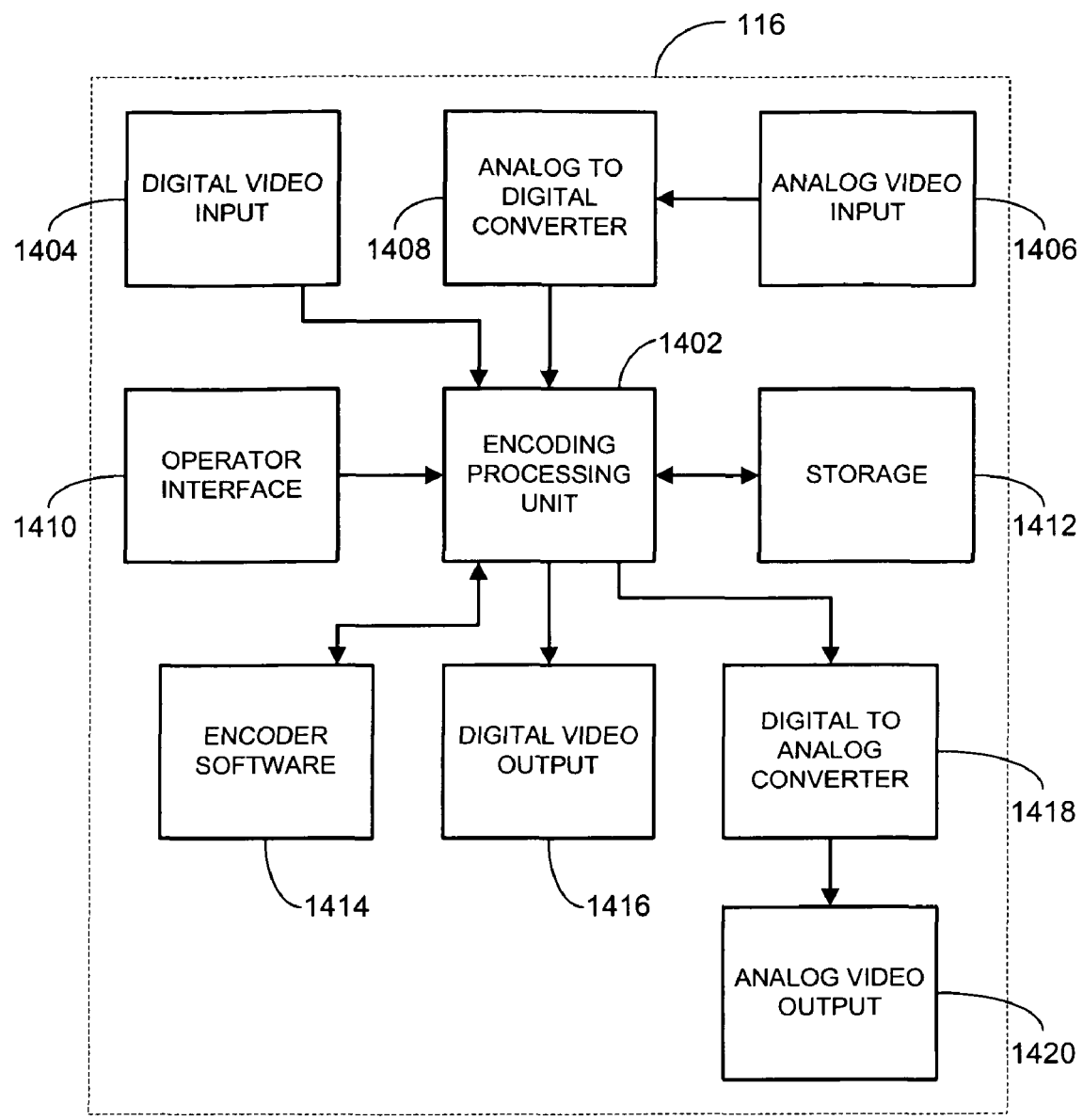
FIG. 14 is a block diagram of an example encoder that may be deployed in the encoding system of FIG. 1 according to an example embodiment.

FIG. 14 illustrates an example encoder 106 (see FIG. 1) that may be deployed in the encoding system 100 or another system.

The encoder 106 may be a computer with specialized input/output hardware, an application specific circuit, programmable hardware, an integrated circuit, an application software unit, a central process unit (CPU) and/or other hardware and/or software combinations.

The encoder 106 may include an encoder processing unit 1402 that may direct operation of the encoder 106. For example, the encoder processing unit 1402 may alter attributes of the content signal 104 to produce the encoded content signal 112 containing the message 110.

A digital video input 1404 may be in operative association with the encoder processing unit 1402 and may be capable of receiving the content signal 104 from the signal source 102. However, the encoder 106 may additionally or alternatively receive an analog content signal 104 through an analog video input 1406 and an analog-to-digital converter 1408. For example, the analog-to-digital converter 1408 may digitize the analog content signal 104 such that a digitized content signal 104 may be provided to the encoder processing unit 1402.

An operator interface 1410 may be operatively associated with encoder processing unit 1402 and may provide the encoder processing unit 1402 with instructions including where, when and/or at what magnitude the encoder 106 should selectively raise and/or lower a pixel value (e.g., the luminance and/or chrominance level of one or more pixels or groupings thereof at the direction of the operator 108). The instructions may be obtained by the operator interface 1410 through a port and/or an integrated operator interface. However, other device interconnects of the encoder 106 may be used including a serial port, universal serial bus (USB), "Firewire" protocol (IEEE 1394), and/or various wireless protocols. In an example embodiment, responsibilities of the operator 108 and/or the operator interface 1410 may be partially or wholly integrated with the encoder software 1414 such that the encoder 106 may operate in an automated manner.

When encoder processing unit 1402 receives operator instructions and the content signal 104, the encoder processing unit 1402 may store the luminance values and/or chrominance values as desired of the content signal 104 in storage 1412. The storage 1412 may have the capacity to hold and retain signals (e.g., fields and/or frames of the content signal 104 and corresponding audio signals) in a digital form for access (e.g., by the encoder processing unit 1402). The storage 1412 may be primary storage and/or secondary storage, and may include memory.

After modulating the content signal 104 with the message 110, the encoder 106 may send the resulting encoded content signal 112 in a digital format through a digital video output 1416 or in an analog format by converting the resulting digital signal with a digital-to-analog converter 1418 and outputting the encoded content signal 112 by an analog video output 1420.

The encoder 106 need not include both the digital video input 1404 and the digital video output 1416 in combination with the analog video input 1406 and the analog video output 1420. Rather, a lesser number of the inputs 1404, 1406 and/or the outputs 1416, 1420 may be included. In addition, other forms of inputting and/or outputting the content signal 104 (and the encoded content signal 112) may be interchangeably used.

In an example embodiment, components used by the encoder 106 may differ when the functionality of the encoder 106 is included in a pre-existing device as opposed to a stand alone custom device. The encoder 106 may include varying degrees of hardware and/or software, as various components may interchangeably be used.

Figure 15:
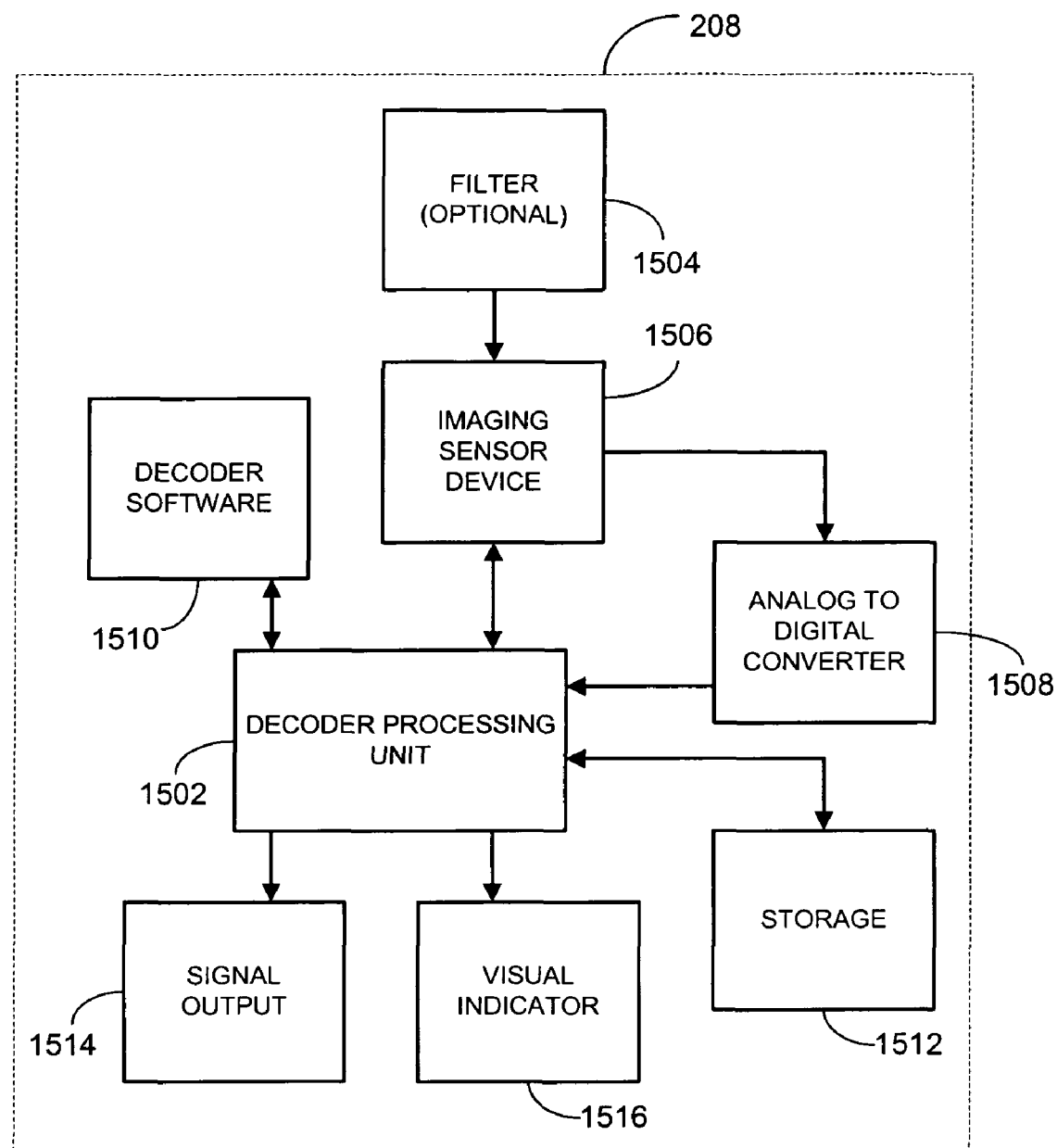
FIG. 15 is a block diagram of an example optical decoder that may be deployed in the decoding system of FIG. 2 according to an example embodiment.

FIG. 15 illustrates an example optical decoder 208 (see FIG. 2) that may be deployed in the decoding system 200 or another system.

The optical decoder 208 may include an imaging sensor device 1506 operatively associated with an analog-to-digital converter 1508 and a decoder processing unit 1502 to optically detect the encoded content signal 112 (e.g., as may be presented on the display device 206.1., 206.2 of FIG. 2).

In an example embodiment, the imaging sensor device 1506 may be a CMOS (Complimentary Metal Oxide Semiconductor) imaging sensor, while in another example embodiment the imaging sensor device may be a CCD (Charge-Coupled Device) imaging sensor. The imaging sensor device 1506 may be in focus to detect motion on the display device 206.1, 206.2 relative to background.

The decoder processing unit 1502 may be an application specific circuit, programmable hardware, integrated circuit, application software unit, and/or hardware and/or software combination. The decoder processing unit 1502 may store the values (e.g., luminance, chrominance, or luminance and chrominance) of the encoded content signal 112 in storage 1512 and may detect pixels that have increased and/or decreased pixel values. The decoder processing unit 1502 may process the encoded content signal 112 to detect the message 110.

A filter 1504 may be placed over a lens of the imaging sensor device 1506 to enhance the readability of the message 110 contained within the encoded content signal 112. For example, an optical filter (e.g., a red filter or a green filter) may be placed over a lens of the imaging sensor device 1506. A digital filter and other types of filters may also be used.

A signal output 1514 may be electrically coupled to the decoder processing unit 1502 and provide a data output for the message 110 and/or data associated with the message 110 after further processing by the optical decoder 208. For example, the data output may be one-bit data and/or multi-bit data.

An optional visual indicator 1516 may be further electrically coupled to the decoder processing unit 1502 and may provide a visual and/or audio feedback to a user of the optical decoder 208, which may by way of example include notice of availability of promotional opportunities based on the receipt of the message.

The decoder processing unit 1502 may store the pixel variable values of the encoded content signal 112 in the storage 1512 and detect the alteration to the pixel variable values of the encoded content signal 112. In an example embodiment, the functionality of the storage 1512 may include the functionality of the storage 1412 (see FIG. 14).

Figure 16:
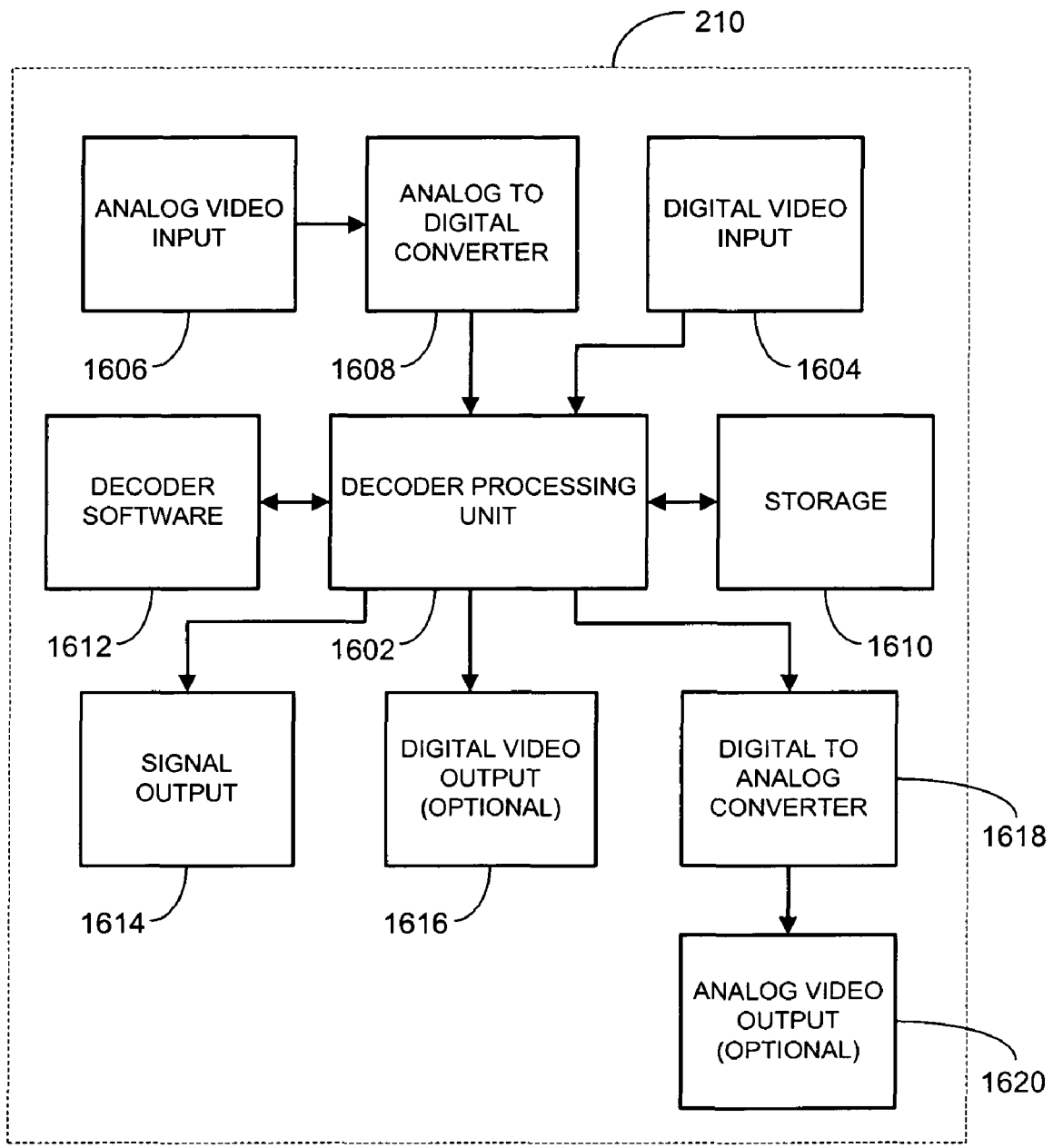
FIG. 16 is a block diagram of an example inline decoder that may be deployed in the decoding system of FIG. 2 according to an example embodiment.

FIG. 16 illustrates an example inline decoder 210 (see FIG. 2) that may be deployed in the decoding system 200 or another system.

The inline decoder 210 may include an analog video input 1606 to receive the encoded content signal 112 from the broadcast source 114 when the encoded content signal 112 is an analog format, and a digital video input 1604 for receiving the encoded content signal 112 when the encoded content signal 112 is in a digital format. For example, the digital video input 1604 may directly pass the encoded content signal 112 to a decoder processing unit 1602, while the analog video input 1606 may digitize the encoded content signal 112 by use of an analog-to-digital converter 1608 before passing the encoded content signal 112 to the decoder processing unit 1602. However, other configurations of inputs and/or outputs of encoded content signal 112 may also be used.

The decoder processing unit 1602 may process the encoded content signal 112 to detect the message 110. The decoder processing unit 1602 may be an application specific circuit, programmable hardware, integrated circuit, application software unit, and/or hardware and/or software combination. The decoder processing unit 1602 may store the pixel values (e.g., luminance, chrominance, or luminance and chrominance) of the encoded content signal 112 in storage 1610 and may detect pixels that have increased or decreased pixel values. The decoder processing unit 1602 may process the encoded content signal 112 to detect the message 110.

The message 110 may be transferred from the inline decoder 210 to the signaled device 214 (see FIG. 2) by a signal output 1614. The inline decoder 210 may optionally output the encoded content signal 112 in a digital format through a digital video output 1616 and/or in an analog format by first converting the encoded content signal 112 from the digital format to the analog format by use of an digital-to-analog converter 1618, and then outputting the encoded content signal 112 through an analog video output 1620. However, the inline decoder 210 need not output the encoded content signal 112 unless otherwise desired.

Figure 17:
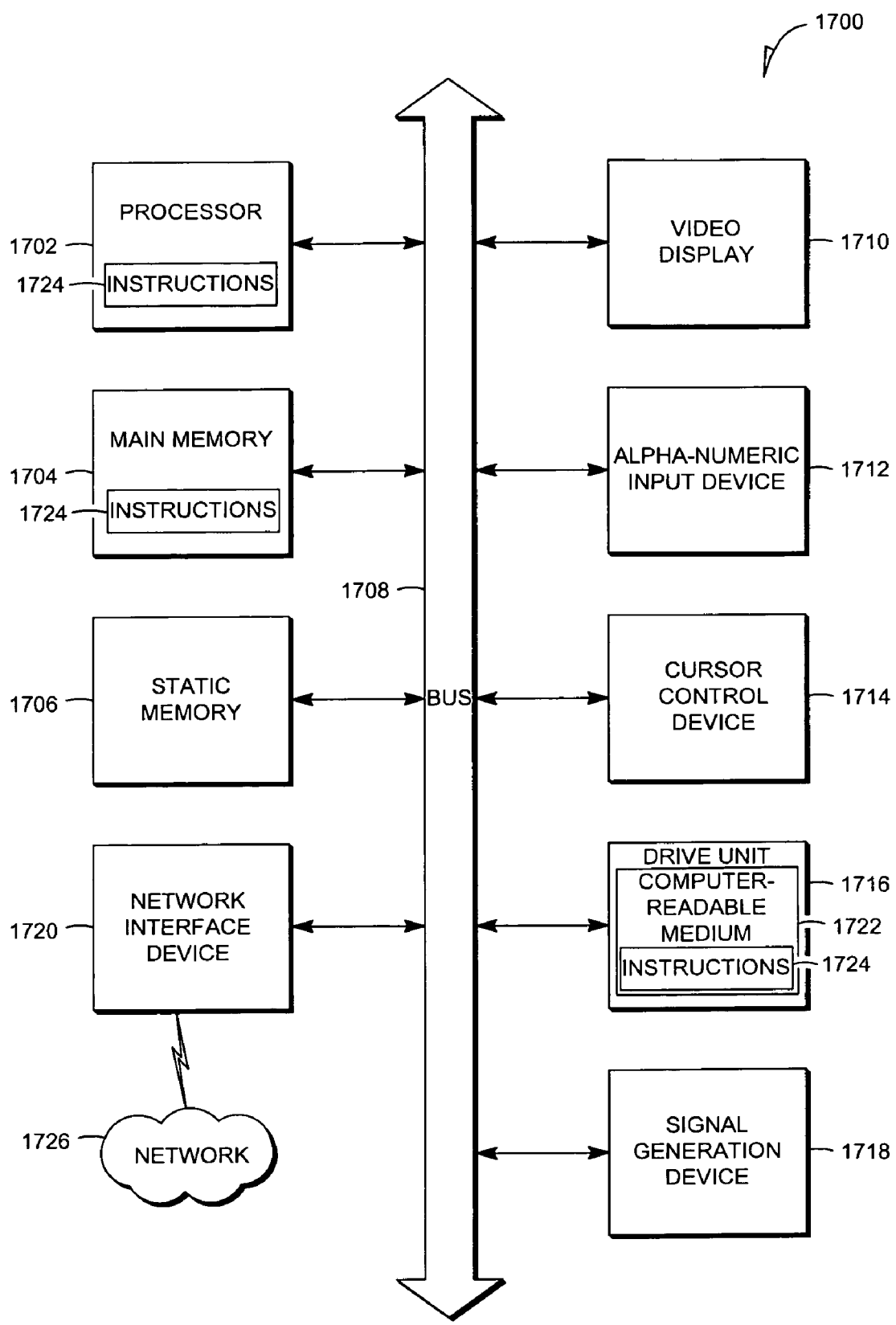
FIG. 17 illustrates a diagrammatic representation of a machine in the example form of a computer system within which a set of instructions for causing the machine to perform any one or more of the methodologies discussed herein may be executed.

FIG. 17 shows a diagrammatic representation of machine in the example form of a computer system 1700 within which a set of instructions may be executed causing the machine to perform any one or more of the methods, processes, operations, or methodologies discussed herein. The signal source 102, the encoder 106, the broadcast source 114, the display device 206.1, 206.2, the optical decoder 208, the inline decoder 210, and/or the signaled device 214 may include the functionality of the computer system 1700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a drive unit 1716, a signal generation device 1718 (e.g., a speaker) and a network interface device 1720.

The drive unit 1716 includes a machine-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for spatial data encoding and decoding have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
designating a tile within a source frame, the tile including a plurality of available pixels;
dividing the tile into at least one bit area, a particular bit area of the at least one bit area capable of being encoded with one or more message bits;
accessing a modulation pattern including a plurality of modulation pattern values;
accessing a particular message bit value of a message;
performing a statistical property calculation on a pixel variable value of the plurality of available pixels within the tile; and
shifting a pixel variable value of a plurality of pixels in the particular bit area of a target frame to encode a particular message bit of the one or more message bits, a particular pixel variable value of a particular pixel of the plurality of pixels being shifted by a shift value, the shift value being in accordance with the statistical property calculation, the particular message bit value, and a particular modulation pattern value of the plurality of modulation pattern values for the particular pixel within the particular bit area.

2. The method of claim 1, wherein the performing of the statistical property calculation comprises:
obtaining a calculated value by calculating a standard deviation of the particular pixel variable value for the plurality of available pixels; and
adjusting the calculated value by a multiplier.

3. The method of claim 1, wherein the performing of the statistical property calculation comprises:
calculating a first pixel variable value average and a second pixel variable value average for the tile;
calculating a first pixel variable value variance and a second pixel variable value variance for the tile;
calculating a covariance for first pixel variable value and second pixel variable value for the tile;
determining a color ratio for the tile, the color ratio being a linear combination of the first pixel variable value and the second pixel variable value; and
normalizing the color ratio.

4. The method of claim 3, wherein the first pixel variable value is red chrominance and the second pixel variable value is blue chrominance.

5. The method of claim 1, wherein the performing of the statistical property calculation comprises:
performing the statistical property calculation on a plurality of pixel variable values of the plurality of available pixels within the tile.

6. The method of claim 5, wherein the shifting of the pixel variable value comprises:
shifting the plurality of pixel variable values of the plurality of pixels in the particular bit area of a target frame to encode a particular message bit of the one or more message bits.

7. The method of claim 1, wherein the modulation pattern is a result of a conversion to real space from DCT space, a source pattern in the DCT space having had removed at least one of a high frequency component that is not resistant to compression, a low frequency component that is more visible, or combinations thereof.

8. The method of claim 1, further comprising:
selecting the source frame as the target frame.

9. The method of claim 1, further comprising:
determining a message color factor for the message;
wherein the shift value is in accordance with the statistical property calculation, the particular message bit value, the particular modulation pattern value of the plurality of modulation pattern values for the particular pixel within the particular bit area, and the message color factor.

10. The method of claim 1, wherein the particular bit area is the size of an MPEG macro block.

11. A non-transitory machine-readable medium storing instructions, which when implemented by one or more processors perform the following operations:
designate a tile within a source frame, the tile including a plurality of available pixels;
divide the tile into at least one bit area, a particular bit area of the at least one bit area capable of being encoded with one or more message bits;
access a modulation pattern including a plurality of modulation pattern values;
access a particular message bit value of a message;
perform a statistical property calculation on a pixel variable value of the plurality of available pixels within the tile; and
shift a pixel variable value of a plurality of pixels in the particular bit area of a target frame to encode a particular message bit of the one or more message bits, a particular pixel variable value of a particular pixel of the plurality of pixels being shifted by a shift value, the shift value being in accordance with the statistical property calculation, the particular message bit value, and a particular modulation pattern value of the plurality of modulation pattern values for the particular pixel within the particular bit area.

12. The machine-readable medium of claim 11, wherein the one or more instructions to perform the statistical property calculation include:
calculate a first pixel variable value average and a second pixel variable value average for the tile;
calculate a first pixel variable value variance and a second pixel variable value variance for the tile;
calculate a covariance for first pixel variable value and second pixel variable value for the tile;
determine a color ratio for the tile, the color ratio being a linear combination of the first pixel variable value and the second pixel variable value; and
normalize the color ratio.

13. The machine-readable medium of claim 12, wherein the first pixel variable value is red chrominance and the second pixel variable value is blue chrominance.

14. The machine-readable medium of claim 11, wherein the one or more instructions to perform the statistical property calculation include perform the statistical property calculation on a plurality of pixel variable values of the plurality of available pixels within the tile; and
wherein the one or more instructions to shift the pixel variable value include shift the plurality of pixel variable values of the plurality of pixels in the particular bit area of a target frame to encode a particular message bit of the one or more message bits.

15. The machine-readable medium of claim 11, wherein the one or more instructions to perform a statistical property calculation include:
obtaining a calculated value by calculating a standard deviation of the particular pixel variable value for the plurality of available pixels; and
adjusting the calculated value by a multiplier.

16. The machine-readable medium of claim 11, wherein the one or more instructions to perform the statistical property calculation comprises:

performing the statistical property calculation on a plurality of pixel variable values of the plurality of available pixels within the tile.

17. The machine-readable medium of claim 16, wherein the shifting of the pixel variable value comprises:
shifting the plurality of pixel variable values of the plurality of pixels in the particular bit area of a target frame to encode a particular message bit of the one or more message bits.

18. The machine-readable medium of claim 11, wherein the modulation pattern is a result of a conversion to real space from DCT space, a source pattern in the DCT space having had removed at least one of a high frequency component that is not resistant to compression, a low frequency component that is more visible, or combinations thereof.

19. A system comprising:
a processor and a memory coupled to the processor;
a tile designation module to designate a tile within a source frame, the tile including a plurality of available pixels;
a tile dividing module to divide the tile into at least one bit area, a particular bit area of the at least one bit area capable of being encoded with one or more message bits;
a modulation pattern access module to access a modulation pattern including a plurality of modulation pattern values;
a message access module to access a particular message bit value of a message;
a statistical property calculation module to perform a statistical property calculation on a pixel variable value of the plurality of available pixels within the tile; and
a shifting module to shift a pixel variable value of a plurality of pixels in the particular bit area of a target frame to encode a particular message bit of the one or more message bits, a particular pixel variable value of a particular pixel of the plurality of pixels being shifted by a shift value, the shift value being in accordance with the statistical property calculation, the particular message bit value, and a particular modulation pattern value of the plurality of modulation pattern values for the particular pixel within the particular bit area.

20. The system of claim 19, wherein the statistical property calculation module is to obtain a calculated value by calculating a standard deviation of the particular pixel variable value for the plurality of available pixels and to adjust the calculated value by a multiplier.

21. The system of claim 19, wherein the statistical property calculation module is configured to:
calculate a first pixel variable value average and a second pixel variable value average for the tile;
calculate a first pixel variable value variance and a second pixel variable value variance for the tile;
calculate a covariance for first pixel variable value and second pixel variable value for the tile;
determine a color ratio for the tile, the color ratio being a linear combination of the first pixel variable value and the second pixel variable value; and
normalize the color ratio.

* * * * *